United States Patent [19]

Hasegawa

[11] Patent Number: 4,461,263
[45] Date of Patent: Jul. 24, 1984

[54] ELECTRONIC FUEL INJECTION CONTROL SYSTEM FOR INTERNAL COMBUSTION ENGINES HAVING EXHAUST GAS RECIRCULATION CONTROL DEVICES

[75] Inventor: Shumpei Hasegawa, Niiza, Japan
[73] Assignee: Honda Motor Co., Ltd., Tokyo, Japan
[21] Appl. No.: 442,578
[22] Filed: Nov. 18, 1982
[30] Foreign Application Priority Data
Nov. 20, 1981 [JP] Japan ................. 56-186633
[51] Int. Cl.³ ................... F02M 25/06; F02B 3/08; F02D 17/00
[52] U.S. Cl. ................... 123/571; 123/480; 123/489; 123/491; 364/431.06; 364/431.04
[58] Field of Search ........... 123/571, 568, 480, 489, 123/491; 364/431.06, 431.04

[56] References Cited

U.S. PATENT DOCUMENTS

| | | | |
|---|---|---|---|
| 4,165,722 | 8/1979 | Aoyama | 123/571 |
| 4,181,944 | 1/1980 | Yamauchi et al. | 123/571 |
| 4,347,570 | 8/1982 | Akiyama et al. | 123/571 |
| 4,369,752 | 1/1983 | Ito et al. | 123/568 |
| 4,375,800 | 3/1983 | Otsuka et al. | 123/571 |
| 4,380,988 | 7/1983 | Otsuka et al. | 123/571 |
| 4,388,909 | 6/1983 | Ogasawara et al. | 123/571 X |
| 4,399,791 | 8/1983 | Kobayashi et al. | 123/571 X |
| 4,399,799 | 8/1983 | Romblom et al. | 123/571 |
| 4,409,948 | 10/1983 | Hasegawa et al. | 123/571 |

FOREIGN PATENT DOCUMENTS

| | | | |
|---|---|---|---|
| 54-17421 | 2/1979 | Japan | 123/571 |
| 54-20203 | 2/1979 | Japan | 123/571 |
| 54-38438 | 3/1979 | Japan | 123/571 |
| 2006988 | 5/1979 | United Kingdom | 123/571 |

Primary Examiner—Wendell E. Burns
Attorney, Agent, or Firm—Arthur L. Lessler

[57] ABSTRACT

An electronic fuel injection control system for an internal combustion engine, includes means for correcting the valve opening of the exhaust gas recirculation valve by the use of a correction coefficient so as to maintain the recirculating quantity of exhaust gases at a constant ratio with respect to the total intake air quantity, irrespective of changes in the ambient atmospheric pressure, and means for correcting the injection period for fuel being supplied to the engine as a function of atmospheric absolute pressure and intake pipe absolute pressure, whereby the air/fuel ratio of the mixture is maintained at an optimum value against changes in the atmospheric pressure, even when exhaust gas recirculation is effected.

5 Claims, 20 Drawing Figures

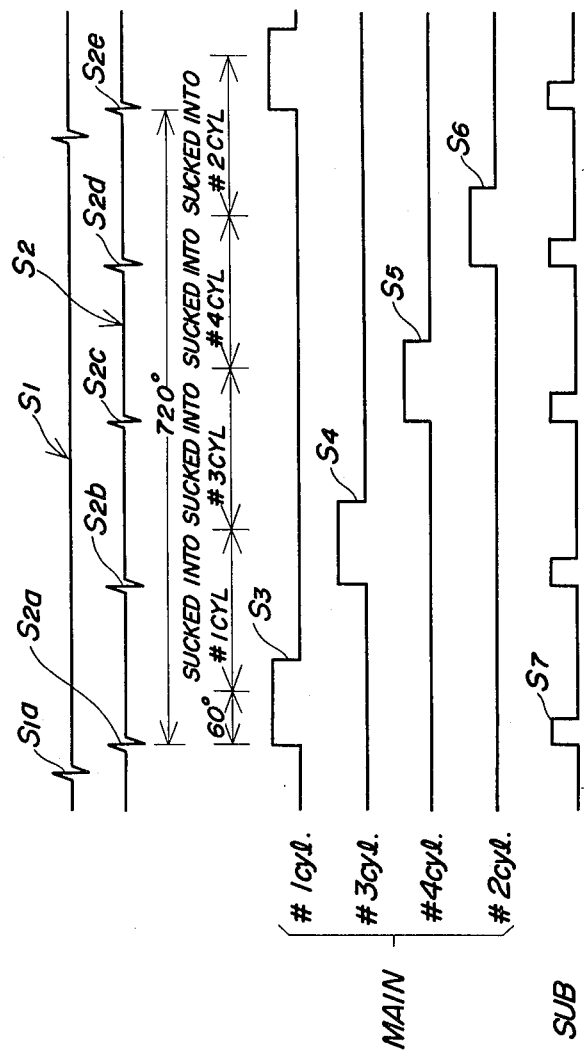

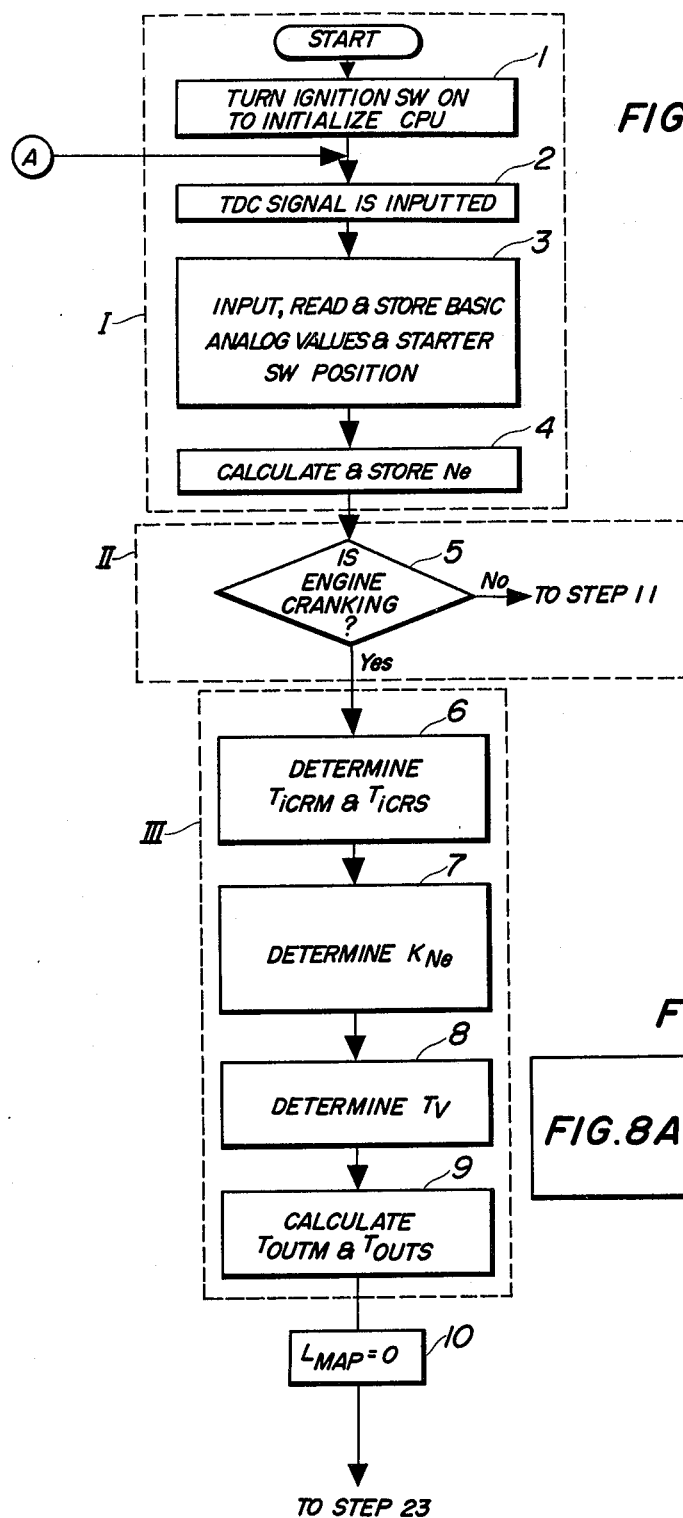

| Ne \ PB | PB6 | PB7 | --- | PBj | --- | PB15 |
|---|---|---|---|---|---|---|
| N1 | L1.6 | L1.7 | | | | |
| N2 | L2.6 | L2.7 | | | | |
| ⋮ | | | | | | |
| Ni | | | | Lij | | |
| ⋮ | | | | | | |
| N10 | | | | | | L10.15 |

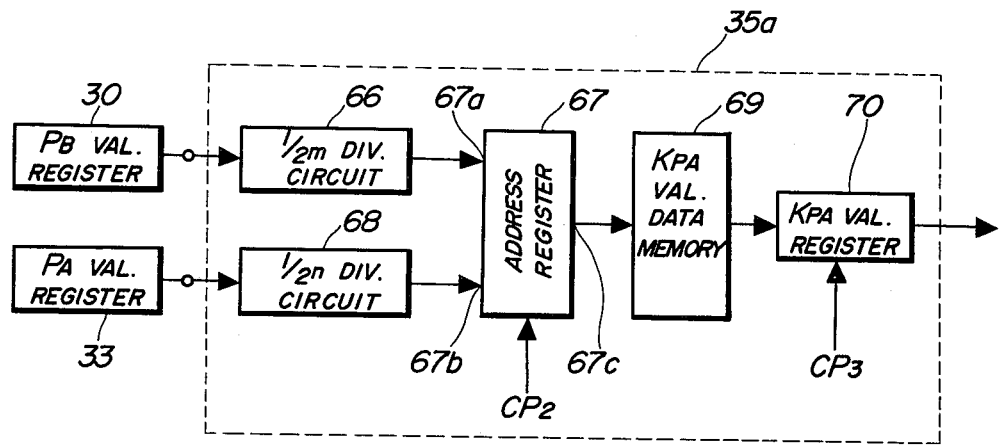

| FIG. 15A | FIG. 15B |
|---|---|

FIG. 16

ELECTRONIC FUEL INJECTION CONTROL SYSTEM FOR INTERNAL COMBUSTION ENGINES HAVING EXHAUST GAS RECIRCULATION CONTROL DEVICES

BACKGROUND OF THE INVENTION

This invention relates to control of the air/fuel ratio of an air/fuel mixture being supplied to an internal combustion engine, and more particularly to an electronic fuel injection control system which is adapted to correct the air/fuel ratio in dependence upon atmospheric pressure and intake pipe absolute pressure so as to maintain the air/fuel ratio at an optimum value during exhaust gas recirculating operation.

A fuel supply control system adapted for use with an internal combustion engine, particularly a gasoline engine has been proposed e.g. by U.S. Ser. No. 348,648, assigned to the same assignee as the present application, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc. by electronic computing means.

On the other hand, during operation of an engine at a high altitude, etc., it is generally carried out to correct the fuel supply quantity for the engine, in response to changes in the atmospheric pressure, so as to obtain an optimum air/fuel ratio best suited for the atmospheric pressure, for improvements in the fuel consumption, emission characteristics and driveability of the engine.

For instance, in a fuel supply control system adapted for correction of the basic valve opening period of a fuel injection valve by means of a correction coefficient as mentioned above, an atmospheric pressure-dependent correction coefficient is provided as one of the aforementioned correction coefficients, for correction of the air/fuel ratio of the mixture.

However, according to such conventional atmospheric pressure-dependent correction of the air/fuel ratio which is determined by intake pipe absolute pressure as noted above, the air/fuel ratio is corrected in dependence upon the atmospheric pressure alone. That is, the correction amount is not based upon the actual operating condition of the engine per se, making it difficult to perform the air/fuel ratio correction in a perfect manner.

On the other hand, in an engine which is provided with an exhaust gas recirculating device for improvement of the emission characteristics of the engine, absolute pressure in the exhaust gas recirculating passage at a location upstream of the exhaust gas recirculation valve, that is, back pressure in the exhaust pipe decreases with a decrease in the atmospheric pressure so that the exhaust gas recirculating rate decreases. As a consequence, the air/fuel ratio of the mixture becomes leaner. The degree of leaning of the air/fuel ratio is larger during exhaust gas recirculating operation than that when the exhaust gas recirculating operation is not effected.

OBJECT AND SUMMARY OF THE INVENTION

It is the object of the invention to provide an electronic fuel injection control system for an internal combustion engine, which is adapted to correct the air/fuel ratio of an air/fuel mixture being supplied to the engine during exhaust gas recirculating operation, in dependence upon not only atmospheric pressure but also intake pipe absolute pressure, so as to always control the air/fuel ratio to a desired value during exhaust gas recirculating operation, irrespective of changes in the atmospheric pressure, to thereby improve the fuel consumption, emission characteristics and driveability of the engine.

The present invention is based upon the recognitions that the quantity of air sucked into the engine cylinders is variable as a function of intake pipe absolute pressure as well as atmospheric pressure, and the atmospheric pressure-dependent air/fuel ratio correction can be made during exhaust gas recirculating operation, by a correcting amount corresponding to that applied for such correction when the exhaust gas recirculating operation is not effected, if the exhaust gas recirculating rate is maintained constant irrespective of changes in the atmospheric pressure.

The present invention provides an electronic fuel injection control system for use with an internal combustion engine, which comprises in combination: a first sensor for detecting a value of engine rpm; a second sensor for detecting a value of absolute pressure in the intake passage of the engine at a location downstream of the throttle valve arranged therein; a third sensor for detecting a value of ambient atmospheric absolute pressure; an exhaust gas recirculation passage communicating the exhaust passage of the engine with the intake passage of same at a location downstream of the throttle valve; an exhaust gas recirculation valve arranged across the exhaust gas recirculation passage; means for determining a desired valve opening of the exhaust gas recirculation valve as a function of values of engine rpm and intake passage absolute pressure detected respectively, by the first and second sensors, and generating a command signal indicative of the determined desired valve opening; first correcting means for determining a value of a predetermined correction coefficient as a function of values of engine rpm, intake passage absolute pressure and ambient atmospheric absolute pressure detected, respectively, by the first, second and third sensors, and correcting the desired value opening indicated by the above command signal by the determined value of the above predetermined correction coefficient, whereby a quantity of exhaust gases being recirculated through the exhaust gas recirculation passage is maintained at a constant ratio with respect to a total intake air quantity being supplied to the engine through the intake passage; means responsive to a signal indicative of the corrected valve opening generated by the first correcting means to drive the exhaust gas recirculation valve to open through the corrected valve opening; means for determining a basic valve opening period for at least one fuel injection valve as a function of values of engine rpm and intake passage absolute pressure detected, respectively, by the first and second sensors; second correcting means for correcting the basic valve opening period as a function of values of atmospheric absolute pressure and intake passage absolute pressure detected, respectively, by the second and third sensors; and means responsive to an output from the second correcting means to drive the fuel injection valve to open for a period of time corresponding to the above output.

The above and other objects, features and advantages of the invention will be more apparent from the ensuing detailed description taken in connection with the accompanying drawings.

BRIEF DESCRIPTION OF THE DRAWINGS

FIG. 7 is a timing chart showing the relationship between a cylinder-discriminating signal and a TDC signal inputted to the ECU, and driving signals for the main injectors and the subinjector, outputted from the ECU;

FIGS. 8A and 8B are a flow chart showing a main program for control of the valve opening periods TOUTM and TOUTS;

FIG. 13 is a block diagram illustrating another example of the correction coefficient KPA value determining circuit;

FIG. 14 is a view showing an atmospheric pressure-intake pipe absolute pressure map for determining values of the correction coefficient KPA;

FIG. 16 is a view showing a plurality of intake pipe absolute pressure-engine rpm maps for determining values of the correction coefficient KL, individually applicable under different atmospheric pressure values.

DETAILED DESCRIPTION

The present invention will now be described in detail with reference to the drawings.

Figure 1:
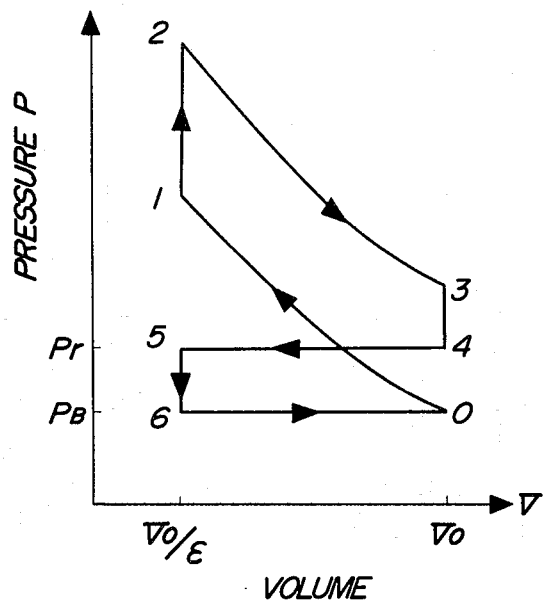
FIG. 1 is a pressure volume diagram of an Otto cycle engine.

FIG. 1 is a pressure volume diagram of an Otto cycle engine. $0 \rightarrow 1$ designates an adiabatic compression step, $1 \rightarrow 2$ an isochoric combustion step, $2 \rightarrow 3$ an adiabatic expansion step, and $3 \rightarrow 4 \rightarrow 5$ an exhaust step, respectively. According to the diagram, when the exhaust valve is closed and simultaneously the intake valve is opened at state point 5, the pressure in the engine cylinder instantaneously drops from a value corresponding to exhaust pipe pressure Pr to a value corresponding to intake pipe pressure PB (step $5 \rightarrow 6$). In the diagram, $6 \rightarrow 0$ designates a suction step where the piston is moved from its top dead center to its bottom dead center.

It will now be explained how the suction gas amount Ga is determined during the step $5 \rightarrow 6 \rightarrow 0$ where fresh air is sucked into the engine cylinder. In the explanation, let it be assumed that first, during the step $5 \rightarrow 6$ the residual gas in the engine cylinder is adiabatically expanded back into the intake pipe, while simultaneously reducing its own pressure from a value corresponding to pressure Pr to a value corresponding to pressure PB, and during the following step $6 \rightarrow 0$, the flowing-back residual gas and fresh air are sucked into the cylinder, while simultaneously exchanging heat with each other. Further, the heat exchange between the cylinder wall and the intake pipe wall, and the residual gas and fresh air is not taken into account in the assumption. Let it be also assumed as a second assumption that the residual gas and fresh air behave as ideal fluid and assume identical values with each other with respect to gas constant Ra, specific heat at constant pressure Cp, specific heat at constant volume Cv, and ratio of specific heat $\chi$.

Figure 2:
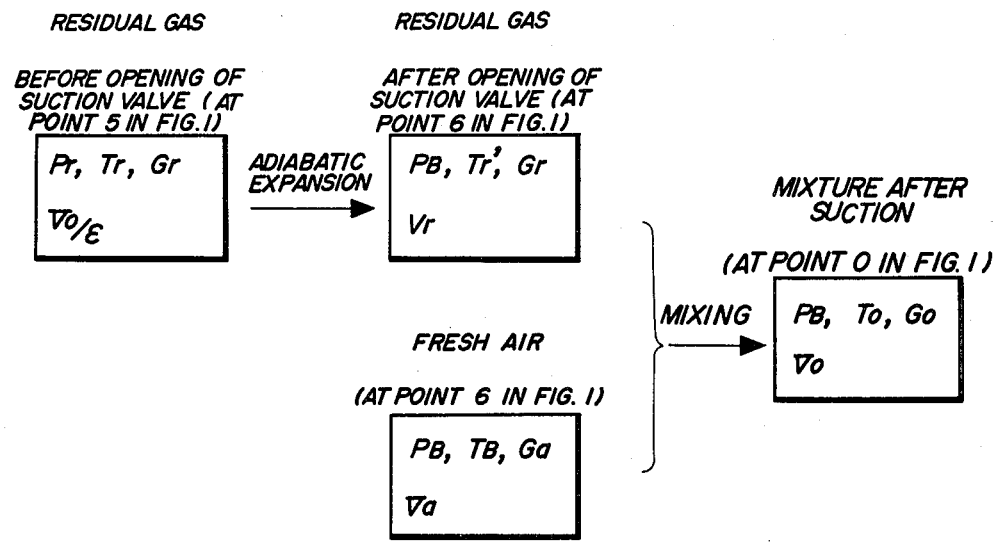
FIG. 2 is a view illustrating quantities of state of residual exhaust gas, fresh air, and a mixture thereof available, respectively, at state points 5, 6 and 0 in FIG. 1.

FIG. 2 shows the quantities of state of the residual gas, the fresh air and a mixture thereof, respectively, at state points 5, 6 and 0. The relationships between these quantities of state can be represented by the following equations. Symbols used in the equations are interpreted as follows:

P = pressure (Kg/cm²abs.),
T = temperature (°K.),
G = quantity of air (Kg),
V = volume (m³),
$\epsilon$ = compression ratio of the engine,
$\chi$ = ratio of specific heat of air,
C = Vo/Ro, which is constant,
r, r' = as of residual gas,
B = as in the intake pipe,
a = as of fresh air, and
o = as at state point 0 in FIG. 1

According to the above second assumption that all the gases have the same value Cv and to the principle of conservation of energy, $$Go \cdot Cv \cdot To = Gr \cdot Cv \cdot Tr' + Ga \cdot Cv \cdot Tb \tag{1}$$

According to the equation of adiabatic change, $$Tr' = Tr(PB/Pr)^{(\chi-1)/\chi} \tag{2}$$

$$Vr = (Vo/\epsilon) \times (Pr/PB)^{1/\chi} \tag{3}$$

According to the equation of state, $$Pr \cdot Vo/\epsilon = Gr \cdot Ra \cdot Tr \tag{4}$$

$$PB \cdot Vr = Gr \cdot Ra \cdot Tr \quad (5)$$

$$PB \cdot Va = Ga \cdot Ra \cdot TB \quad (6)$$

$$PB \cdot Vo = Go \cdot Ra \cdot To \quad (7)$$

From the equations (1), (5) and (6), $$PB(Vr + Va) = Ra \cdot Go \cdot To \quad (8)$$

If the equation (7) is substituted into the equation (8), $$Vr + Va = Vo \quad (9)$$

The equation (9) shows that the mixture does not change in volume so long as its own pressure is constant.

If the equations (3) and (6) are applied to the equation (9), $$Ga = C \cdot PB/TB \{1 - (1/\epsilon)(Pr/PB)^{1/x}\} \quad (10)$$

The equation (10) forms the basic principle of the present invention, showing that the quantity of suction air Ga is given as a function of intake pipe pressure PB, intake pipe temperature TB, and exhaust pipe pressure Pr.

In the event that there occurs a change in the back pressure or exhaust pipe pressure Pr at the step 3-4-5 in FIG. 1, in order to control the actual air/fuel ratio Ga/Gf (Gf=fuel quantity) to an air/fuel ratio Gao/Gfo at standard atmospheric pressure, that is, in order to satisfy the following equation:

$$Ga/Gf = Gao/Gfo \quad (11)$$

a quantity of fuel has to be supplied to the engine, which is determined by the following equation:

$$Gf = Gfo \times Ga/Gao = Gfo \times \frac{1 - (1/\epsilon)(Pr/PB)^{1/x}}{1 - (1/\epsilon)(Pro/PB)^{1/x}} \quad (12)$$

provided that TB remains constant.

Next, let us consider about the relationship between the back pressure Pr and the required fuel supply quantity, which is required for an engine during exhaust gas recirculation. Provided that the exhaust gas recirculation quantity is designated by GE, the quantity of fresh intake air Ga′, and the total intake air quantity GT, $$GT = Ga' + GE \quad (13)$$

Although the equation (10) is based upon the assumption that fresh air alone is present in the intake pipe, theoretically the same equation can be satisfied even if the intake air in the intake pipe comprises a mixture of fresh air and exhaust gases returned from the exhaust pipe. That is, the total intake air quantity GT can be determined from the following equation:

$$GT = C(PB/TB)\{1 - (1/\epsilon)(Pr/PB)^{1/x}\} \quad (14)$$

It will be leaned from the equation (14) that the total intake air quantity GT increases with a decrease in the back pressure PR.

On the other hand, the exhaust gas recirculation quantity QE (m²/sec) obtained can be represented as follows:

QE α (the effective valve opening area A of the exhaust gas recirculation valve) × (the differential pressure ΔP between the exhaust gas recirculation valve)$^n$ provided that n is equal to $\frac{1}{2} - 1$. If the effective valve opening area A of the exhaust gas recirculation valve remains constant, $$QE \alpha \Delta P^n = (Pr - PB)^n \quad (15)$$

When there occurs a drop in the atmospheric pressure, the back pressure Pr correspondingly decreases so that the value ΔP decreases with the decrease of the back pressure Pr, so long as the intake pipe absolute pressure PB remains constant. Accordingly, the exhaust gas recirculating quantity GE, which is expressed in terms of mass flow rate as equivalent to the quantity QE, also decreases. From the above, it will be learned that the exhaust gas recirculation rate XE (=(GE/(Ga+GE)=GE/GT) decreases with a drop in the atmospheric pressure.

Figure 3:
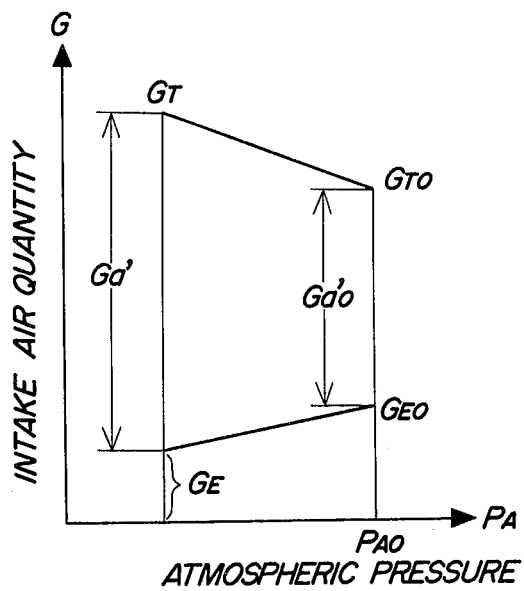
FIG. 3 is a graph showing the relationship between exhaust gas recirculating quantity, total intake air quantity and atmospheric pressure.

FIG. 3 endorses the above explanation, showing that the air/fuel ratio becomes lean to a larger extent when there occurs a drop in the atmospheric pressure during exhaust gas recirculating operation than when the exhaust gas recirculating operation is not effected. That is, the total intake air quantity GT increases when the atmospheric pressure PA drops below the standard atmospheric pressure PAo, irrespective of the exhaust gas recirculation quantity, in accordance with the equation (14). On the other hand, the exhaust gas recirculation quantity GE decreases, with a decrease in the atmospheric pressure in accordance with the equation (15). Accordingly, the quantity of fresh intake air Ga′ (=GT−GE) increases at a rate larger than the increase of the total intake air quantity GT. Also, the increase rate of the total intake air quantity GT becomes larger in proportion to the exhaust gas recirculation quantity GEo under the standard atmospheric pressure PAo. Therefore, it will be learned that the air/fuel ratio will become lean to a larger extent when the exhaust gas recirculating operation is carried out than when the same operation is interrupted, if no atmospheric pressure-dependent correction of the air/fuel ratio is carried out.

Figure 4:
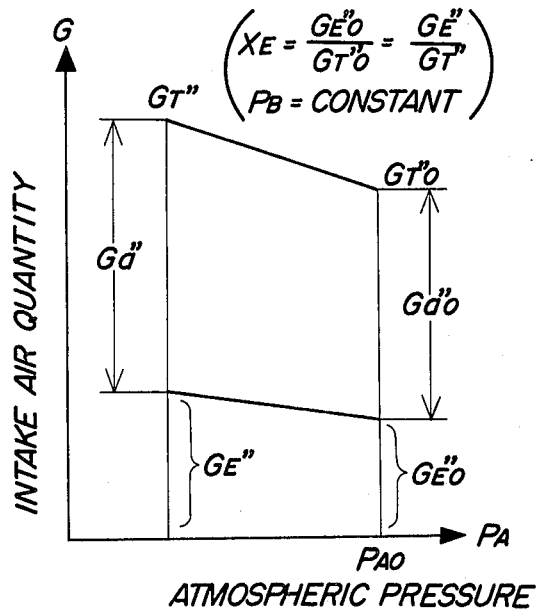
FIG. 4 is a graph showing the relationship between exhaust gas recirculating quantity, total intake air quantity and atmospheric pressure, which is required for maintaining the exhaust gas recirculating rate constant.

To control the exhaust gas recirculation quantity GE″ so as to maintain the exhaust gas recirculation rate XE at a constant value independently of changes in the atmospheric pressure, as shown in FIG. 4, the following relationship must be fulfilled, as derived from the equation (14), provided that the values PB and TB remain constant:

$$GT = GTo \cdot \frac{1 - (1/\epsilon)(Pr/PB)^{1/x}}{1 - (1/\epsilon)(Pro/PB)^{1/x}} \quad (16)$$

If an air/fuel ratio obtained at the standard atmospheric pressure PAo, is designated by $\alpha_o$ (=Ga″o/Gf″o, where Gf″o is a fuel quantity), and an air/fuel ratio at actual atmospheric pressure α (=Ga″/Gf″), respectively, the follwing equation can be derived from the equations (13) and (16), and an equation of XE=GE′o/GT″o=GE″/GT″:

$$\alpha = \alpha_o (Gf''o/Gf'') \cdot \frac{1 - (1/\epsilon)(Pr/PB)^{1/x}}{1 - (1/\epsilon)(Pro/PB)^{1/x}} \quad (17)$$

To make the air/fuel ratio $\alpha$ equal to the one $\alpha_o$, the following equation must be fulfilled:

$$Gf'' = Gf''_o \cdot \frac{1 - (1/\epsilon)(Pr/PB)^{1/x}}{1 - (1/\epsilon)(Pro/PB)^{1/x}} \quad (18)$$

In an internal combustion engine which does not include an element requiring high exhaust pressure, such as a turbocharger, the difference between the pressure Pr and the pressure PA is ignorably small, as compared with the difference between the pressure Pr and the intake pipe pressure PB. Therefore, from the equation (18), the following equations can be reached:

$$GF'' = KPA \times GF''_o \quad (19)$$

$$KPA = \frac{1 - (1/\epsilon)(PA/PB)^{1/x}}{1 - (1/\epsilon)(PAo/PB)^{1/x}} \quad (20)$$

where PA designates actual atmospheric pressure (absolute pressure), PAo standard atmospheric pressure, and KPA an atmospheric pressure-dependent correction coefficient, hereinlater referred to, respectively.

To obtain a desired air/fuel ratio, a fuel quantity Gf'' given by the equation (19) has only to be supplied to the engine. That is, so long as the exhaust gas recirculation quantity GE is controlled so as to keep the exhaust gas recirculation rate XE constant irrespective of changes in the atmospheric pressure, during exhaust gas recirculation the air/fuel ratio can be corrected by the use of the correction coefficient KPA obtained by the equation (20) which is the same as that applicable when the exhaust gas recirculation is not effected, as will be understood by comparing between the two equations (12) and (18).

As noted above, the atmospheric pressure-dependent correction coefficient KPA can be determined as a function of actual atmospheric pressure PA and actual intake pipe absolute pressure PB on condition that the exhaust gas recirculation rate XE remains constant, irrespective of whether or not the exhaust gas recirculation is effected, though the coefficient value KPA basically depends upon the compression ratio of the engine.

The electronic fuel injection control system of the present invention using the correction coefficients KPA and KL for correcting the air/fuel ratio and the exhaust gas recirculating quantity, respectively, in dependence upon the atmospheric pressure will now be described in detail with reference to FIGS. 5 through 16 in which an embodiment of the system is illustrated.

Figure 5:
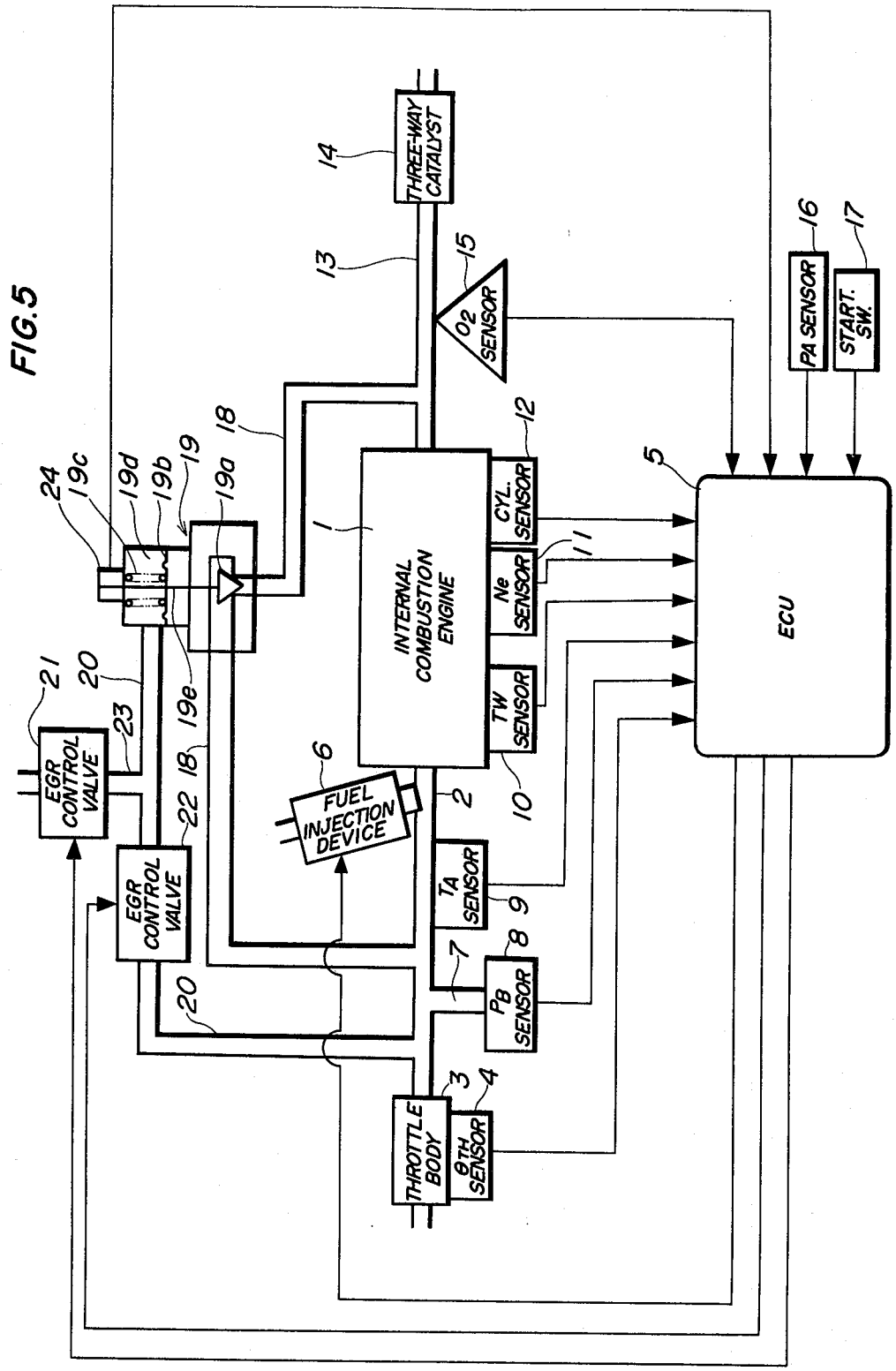
FIG. 5 is a block diagram illustrating the arrangement of a fuel injection control system according to the present invention.

Referring first to FIG. 5, there is illustrated the whole arrangement of a fuel supply control system for internal combustion engines, according to the present invention. Reference numeral 1 designates an internal combustion engine which may be of a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an electrical control unit (hereinafter called "ECU") 5.

A fuel injection device 6 is arranged in the intake pipe 2 at a location between the engine 1 and the throttle body 3, which comprises main injectors and a subinjector, all formed by electromagnetically operated fuel injection valves, none of which is shown in FIG. 5. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The fuel injection device 6 is connected to a fuel pump, not shown. The main injectors and the subinjector are electrically connected to the ECU 5 in a manner having their valve opening periods of fuel injection quantities controlled by driving signals supplied from the ECU 5.

On the other hand, an absolute pressure sensor 8 communicates through a conduit 7 with the interior of the main intake pipe at a location immediately downstream of the main throttle valve of the throttle body 3. The absolute pressure sensor 8 is adapted to detect absolute pressure in the intake pipe 2 and apply an electrical signal indicative of detected absolute pressure to the ECU 5. An intake air temperature sensor 9 is arranged in the intake pipe 2 at a location downstream of the absolute pressure sensor 8 and also electrically connected to the ECU 5 of supplying thereto an electrical signal indicative of detected intake air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., a pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure and a starting switch 17 of the engine, respectively, for supplying an electrical signal indicative of detected atmospheric pressure and an electrical signal indicative of its own on and off positions of the ECU 5.

An exhaust gas recirculating passageway 18 is provided which connects the exhaust pipe 13 at a location upstream of the three-way catalyst 14 to the intake pipe 2 at a location downstream of the throttle bodys, and across which is mounted an exhaust gas recirculation valve 19. This valve 19 is a negative pressure-actuated type and comprises a valve body 19a arranged for opening and closing the passageway 18, a diaphragm 19b coupled to the valve body 19a by means of a valve rod 19e and actuatable by atmospheric pressure or negative pressure which is selectively applied thereto by means of EGR control valves 21 and 22, hereinafter referred to, and a spring 19c urging the diaphragm 19b in the valve closing direction. A negative pressure chamber 19d is defined by the diaphragm 19b, which is connected to a communication passageway 20 for introducing absolute pressure in the intake pipe 2 by way of the EGR control valve 22 which is a normally closed type and arranged across the communication passageway 20. An atmospheric pressure-intake passageway 23 is joined to the communication passageway 20 at a location downstream of the EGR control valve 22 so that atmospheric pressure is introduced into the communication passageway 20 by way of the EGR control valve 21 which is a normally open type and which is arranged across the communication passageway 23, and then guided into the negative pressure chamber 19d. The EGR control valves 21 and 22 are both electrically connected to the ECU 5 for operation in unison with each other or alone in response to control signals from the ECU 5 to control the lifting motion of the valve body 19a of the exhaust gas recirculation valve 19 and the moving speed thereof.

A lift sensor 24, which may be formed of a potentiometer, is mounted on the exhaust gas recirculation valve 19 for detecting the operating position of the valve body 19a of the valve 19 and supplying an electrical signal indicative of its detected operating position of the valve body to the ECU 5.

Next, details of the manner of control of the fuel supply quantity and the exhaust gas recirculation of the fuel injection control system outlined above will now be described with reference to FIG. 5 referred to above as well as FIGS. 6 through 16.

Figure 6:
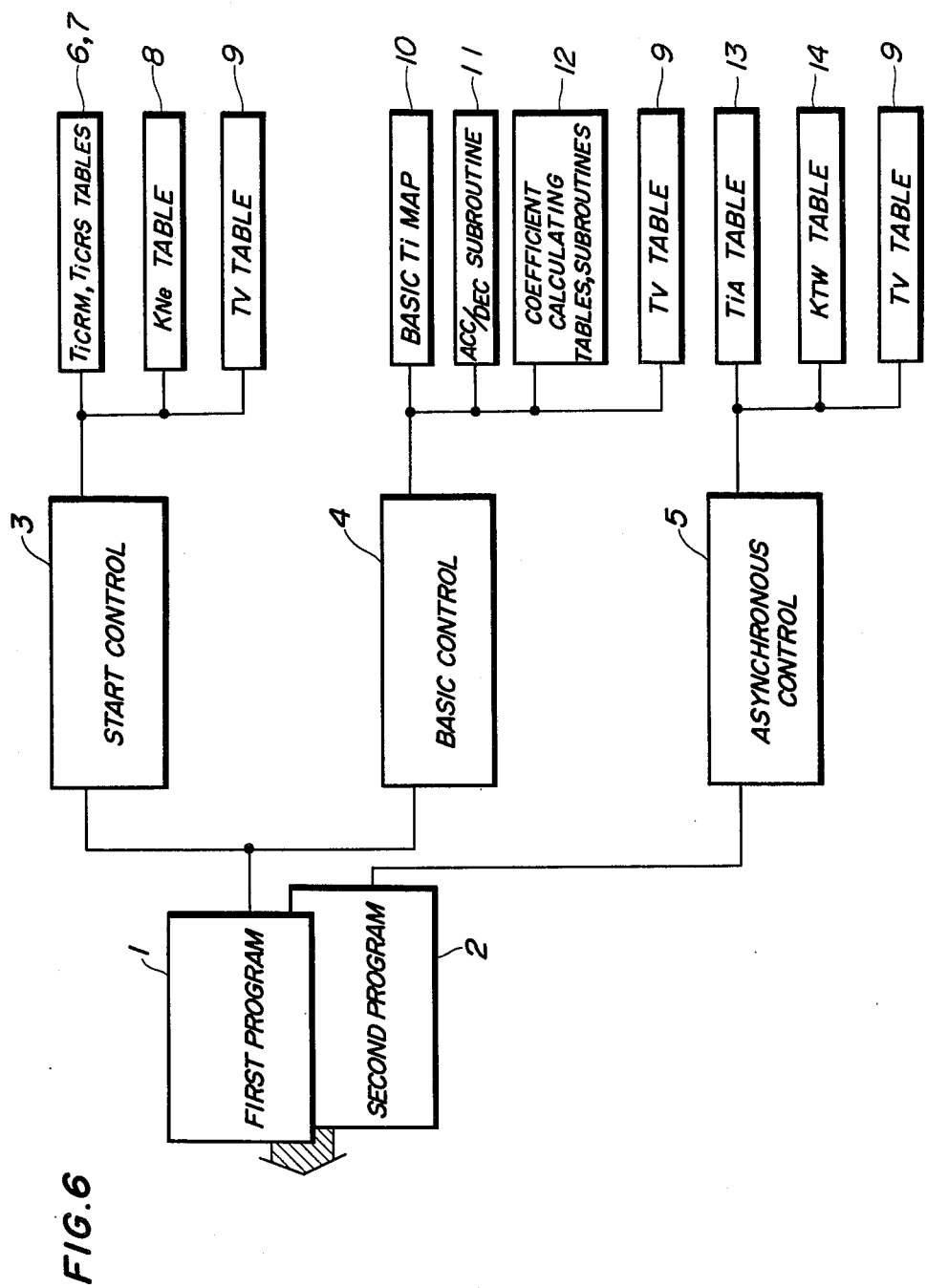
FIG. 6 is a block diagram illustrating a whole program for control of the valve opening periods TOUTM and TOUTS of the main injectors and the subinjector, which is incorporated in the electronic control unit (ECU) in FIG. 5.

FIG. 6 shows a block diagram showing the whole program for air/fuel ratio control, i.e., control of the valve opening periods TOUTM and TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (21)$$

$$TOUTS = TiCRS \times KNe + TV \quad (22)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPA \times KAST \times KWOT \times KO_2 \times KLS) + TACC \times (KTA \times KTWT \times KAFC) + (TV + \Delta TV) \quad (23)$$

$$TOUTS = (TiS - TDEC) \times (KTA \times KTW \times KAST \times KPA) + TV \quad (24)$$

where TiM and TiS represent basic values of the valve opening periods for the main injectors and the subinjector, respectively, and can be determined from a basic Ti map 10, and TDEC and TACC represents constants applicable, respectively, at engine decceleration and at engine acceleration and are determimed by acceleration and decceleration subroutines 11. The coefficients KTA, KTW, etc. are determined by their respective tables and/or subroutines 12. KTA is an intaken air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open throttle and has a constant value, KO$_2$ an "O$_2$ feedback control" correction coefficient determined by a subroutine as a function of actual oxygen concentration in the exhaust gases, and KLS a mixture-leaning coefficient applicale at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with the TDC signal is determined by the following equation:

$$TMA = TiA \times KTWT \times KAST + (TV + \Delta TV) \quad (25)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

FIG. 7 is a timing chart showing the relationship between the cylinder-discriminating signal and the TDC signal, both inputted to the ECU 5, and the driving signals outputted from the ECU 5 for driving the main injectors and the subinjector. The cylinder-discriminating signal $S_1$ is inputted to the ECU 5 in the form of a pulse $S_1$ a each time the engine crankshaft rotates through 720 degrees. Pulses $S_2a$–$S_2e$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_2$ a, the driving signal $S_4$ for the third engine cylinder concurrently with the second TDC signal pulse $S_2$ b, the driving signal $S_5$ for the four cylinder concurrently with the third pulse $S_2$ c, and the driving signal $S_6$ for the second cylinder concurrntly with the four pulse $S_2$ d, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_2$ a, $S_2$ b, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figure 8B:
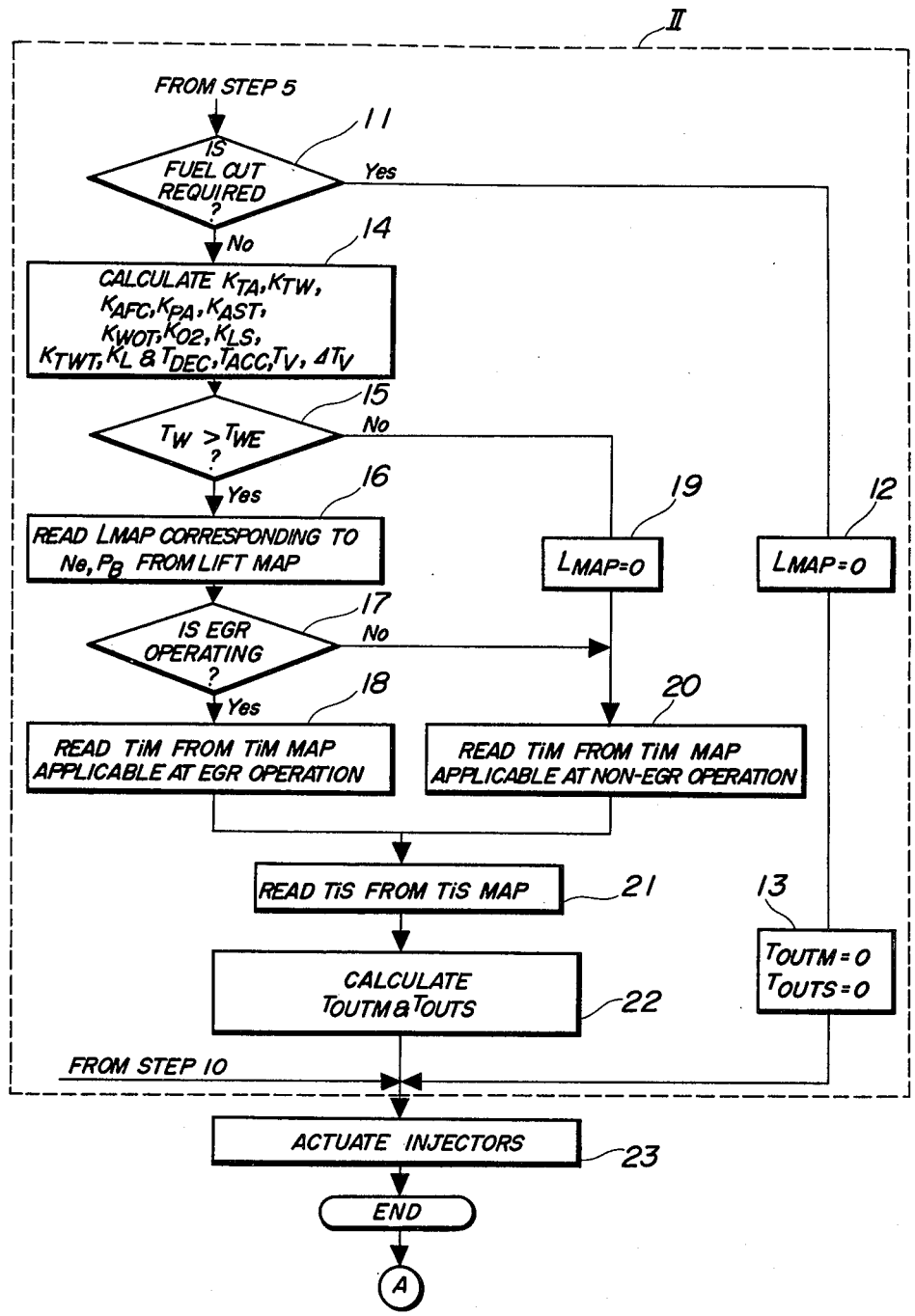

Referring next to FIG. 8, there is shown a flow chart of the aforementioned first program 1 for control of the valve opening period in synchronism with the TDC signal in the ECU 5. The whole program comprises an input signal processing block I, a basic control block II and a start control block III. First in the input processing block I, when the ignition switch of the engine is turned on, a CPU in the ECU 5 is initialized at the step 1 and the TDC signal is inputted to the ECU 5 as the engine starts at the step 2. Then, all basic analog values are inputted to the ECU 5, which include detected values of atmospheric pressure PA, absolute pressure PB, engine cooling water temperature TW, atmospheric air temperature TA, valve lift L of the exhaust gas recirculating valve 19, throttle valve opening $\theta$th, battery voltage V, output voltage value V of the $O_2$ sensor and on-off state of the starting switch 17, some necessary ones of which ae then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6).

Also, the value of Ne-dependent correction coefficient KNe is determined by using the KNe table (step 7). Further, the value of battery voltage-dependent correction constant TV is determined by using the TV table (step 8). These determined values are applied to the aforementioned equations (21), (22) to calculate the values of TOUTM and TOUTS (step 9).

Figures 9, 11:
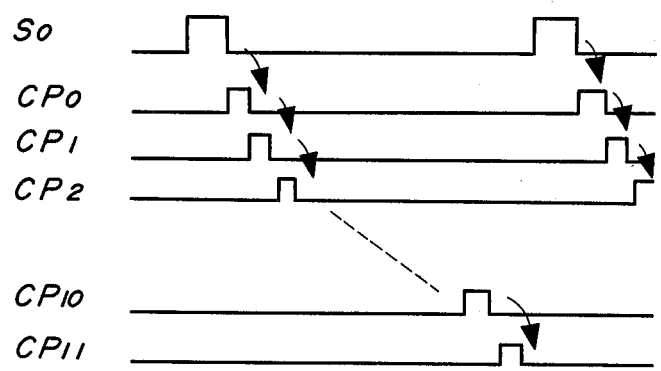
FIG. 9 is a view showing an intake pipe absolute pressure-engine rpm map for determining lift command values for the exhaust gas recirculation valve.
FIG. 11 is a timing chart showing the relationship between a pulse signal So inputted to the sequential clock generator in FIG. 10 and clock pulses generated therefrom.

During the start control subroutine III described above, a valve lift command value LMAP which indicates zero lift is selected at the step 10, to set the valve body lift of the exhaust gas recirculation valve 19 to zero. FIG. 9 shows a map of the lift command value LMAP, where ten steps of different predetermined values PB6–15 of the absolute pressure PB are provided which are set within a range of 204–780 mmHg for instance, and ten steps of different predetermined values N1–10 of the engine rpm Ne set within a range of 0–4000 rpm for instance. Lift command values LMAP are determined by means of interpolation, if actual values of the absolute prssure PB and/or the engine rpm Ne fall between the predetermined values or outside the range or ranges.

If the answer to the question of the above step 5 is no, it is determined whether or not the engine is in a condition for carrying out fuel cut, at the step 11. If the answer is yes, a lift command value LMAP is selected which indicates zero lift, at the step 12, and simultaneously the values of TOUTM and TOUTS are set to zero, at the step 13.

On the other hand, if the answer to the question of the step 11 is negative, calculations are carried out of values of air/fuel ratio correction coefficients KTA, KTW, KAFC, KPA, KAST, KWOT, $KO_2$, KLS, KTWT, etc., a value of correction coefficient KL for correction of the exhaust gas recirculating quantity, and values of correction constants TDEC, TACC, TV and $\Delta$TV, by means of the respective calculation subroutines and tables, at the step 14. The correction coefficient KL is used for maintaining the ratio of the exhaust gas recirculating quantity to the total intake air quantity, i.e. the exhaust gas recirculating rate, irrespective of changes in the atmospheric pressure. Practically, a selected valve lift command value LMAP is multiplied by a determined value of the coefficient KL to correct the valve opening of the exhaust gas recirculation valve 19. The manners of determining values of the correction coefficient KL as well as the correction coefficient KPA will be described in detail hereinafter.

Then, a comparison is made of whether or not actual engine cooling water temperature TW is higher than a predetermined value TWE for carrying out the exhaust gas recirculating operation, at the step 15. If it is found that the former is higher than the latter, a lift command value LMAP is selected from the lift command value map, which corresponds to actual engine rpm Ne and actual intake pipe absolute pressure PB, at the step 16. Then, it is determined whether or not the exhaust gas recirculation valve 19 is operating, at the step 17. The engine operation where the valve 19 is operating will be referred to as "EGR operation" hereinafter, and that where it is at rest as "non-EGR operation", respectively. If the answer to the question of the step 17 is yes, a basic valve opening period value TiM is selected from a TiM map applicable during EGR operation, which corresponds to actual engine rpm Ne and actual absolute pressure PB, at the step 18. If the answer is negative at the step 17, another basic valve opening value TiM is selected from another map of the TiM value applicable during non-EGR operation, which corresponds to actual engine rpm Ne and actual absolute pressure PB, at the step 20.

On the other hand, if the determination at the step 15 gives a negative answer, a lift command value LMAP indicative of zero lift is selected at the step 19, while simultaneously a basic value TiM is selected from the non-EGR operation TiM map, which corresponds to actual engine rpm Ne and actual absolute pressure PB, at the step 20.

Following the above selection of the basic value TiM, a basic valve opening period value TiS is selected from a map of the TiS value, which corresponds to actual engine rpm Ne and actual absolute pressure PB, at the step 21.

Then, calculations are carried out of the values TOUTM and TOUTS on the basis of the values of correction coefficients and correction constants selected as described above, using the aforementioned equation (23), (24) (step 22). The main injectors and the subinjector are actuated with valve opening periods corresponding to the values of TOUTM and TOUTS obtained by the aforementioned steps 9, 13 and 22 (step 23).

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

Figure 10:
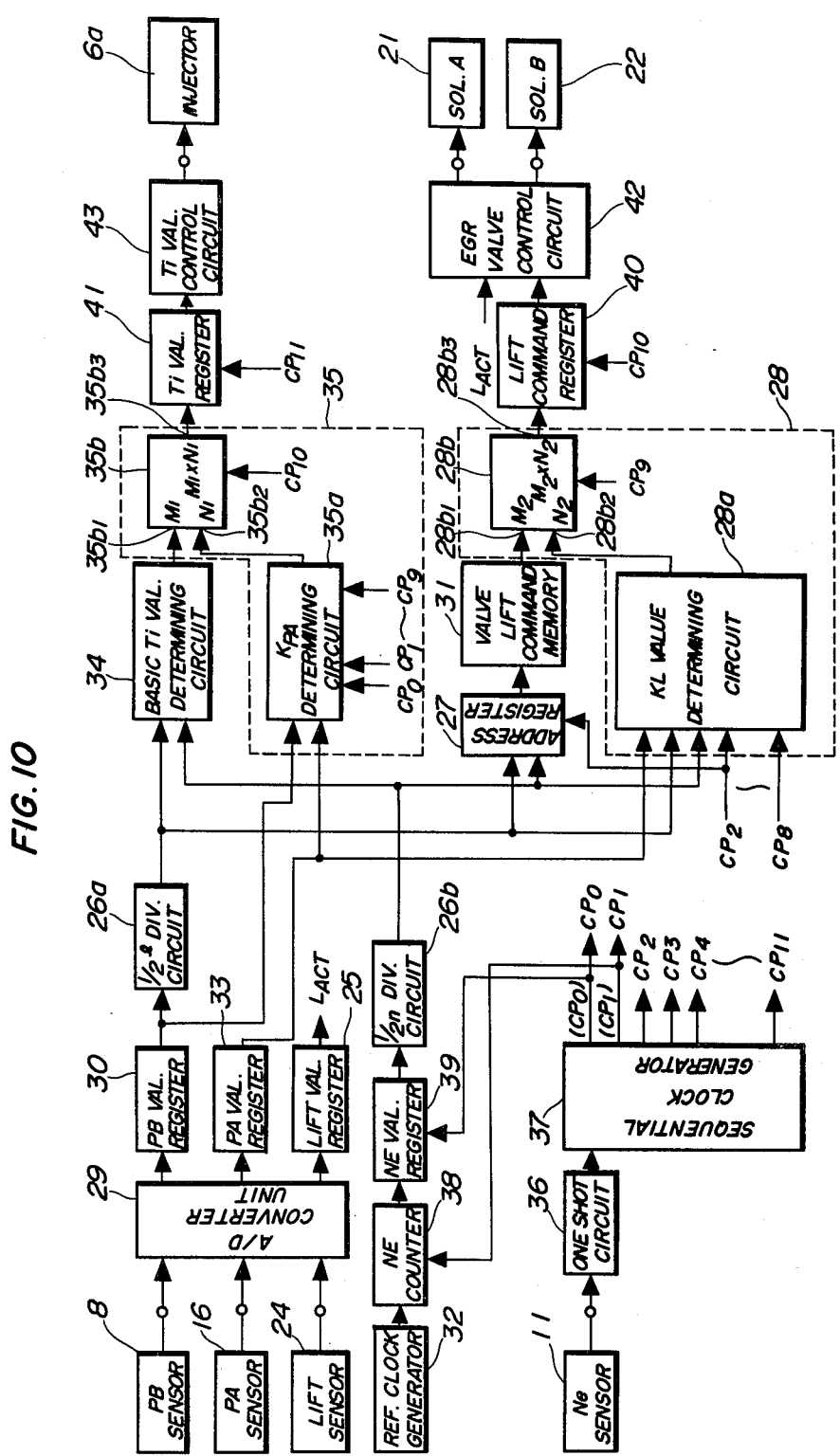
FIG. 10 is a block diagram illustrating the internal arrangement of the ECU in FIG. 5, including circuits for determining values of an atmospheric pressure-dependent correction coefficient KPA for correction of the air/fuel ratio and another atmospheric pressure-dependent correction coefficient KL for correction of the exhaust gas recirculation quantity.

FIG. 10 illustrates the whole internal arrangement of the ECU 5, including circuits for determining values of the air/fuel ratio correction coefficient KPA and the exhaust gas recirculation quantity correction coefficient KL, both previously referred to.

The intake pipe absolute pressure PB sensor 8, the atmospheric pressure PA sensor 16 and the EGR lift sensor 24, all appearing in FIG. 5, are connected, respectively, to a PB value register 30, a PA value register 33 and a lift value register 25 at their inputs, through an A/D converter unit 29. The PB value register 30 has its output connected directly to the input of a KPA value determining circuit 35a forming part of a second atmospheric pressure-dependent correction circuit 35, and also connected, by way of a $\frac{1}{2}^l$ dividing circuit 26a, to a basic Ti value determining circuit 34, an address register 27, and a KL value determining circuit 28a forming part of a first atmospheric pressure-dependent correction circuit 28. The PA value register 33 has its output connected to the input of the KPA value determining circuit 35a as well as the input of the KL value determining circuit 28a. The lift value register 25 has its output connected to the input of an EGR control valve control circuit 42. The engine rpm Ne Sensor 11 in FIG. 5 is connected to the input of a sequential clock generator 37 by way of a one-shot circuit 36. The sequential clock generator 37 has its output connected to the inputs of the address register 27, an NE value counter 38, an NE value register 39, the KPA value determining circuit 35a of the second atmospheric pressure-dependent correction circuit 35, a multiplier 35b of the same circuit 35, a Ti value register 41, the KL value determining circuit 28a of the first atmospheric pressure-dependent correction circuit 28, a multiplier 28b of the same circuit 28, and a lift command register 40. A reference clock generator 32 is connected to the NE value counter 38. The reference clock generator 32, the NE value counter 38, the NE value register 39 and a $\frac{1}{2}^n$ dividing circuit 26b are serially connected to each other in the order mentioned. The $\frac{1}{2}^n$ dividing circuit 26b is connected to the inputs of the basic Ti value determining circuit 34, the address register 27, and the KL value determining circuit 28a. The basic Ti value determining circuit 34 has its output connected to the multiplier 35b at its one input terminal 35b1 of the second atmospheric pressure-dependent correction circuit 35, and the KPA value determining circuit 35a has its output connected to the multiplier 35b at its other input terminal 35b2. The multiplier 35b has its output terminal 35b3 connected to the input of a Ti value control circuit 43 by way of the Ti value register 41. The Ti value control circuit 43 has its output connected to an injector or injectors 6a of the fuel injection device 6 in FIG. 5. The address register 27 has its output connected to the multiplier 28b at its one input terminal 28b1, by way of a valve lift command memory 31. The KL value determining circuit 28a has its output connected to the other input terminal 28b2 of the multiplier 28b which in turn has its output terminal 28b3 connected to the input of the EGR control valve control circuit 42 by way of the lift command register 40. The EGR control valve control circuit 42 has its output connected to the EGR control valves 21 and 22 in FIG. 5, which are shown in FIG. 10 as EGR solenoid-A and EGR solenoid-B, respectively.

A TDC signal outputted from the engine rpm Ne sensor 11 in FIG. 5 is supplied to the one-shot circuit 36 which forms a waveform shaping circuit in cooperation with the adjacent sequential clock generator 37. The one-shot circuit 36 generates an output pulse So each time a pulse of the TDC signal is applied thereto, and the output pulse So actuates the sequential clock generator 37 to sequentially generate clock pulses CP0-11, as shown in FIG. 11. The first clock pulse CP0 is supplied to the engine rpm NE value register 39 to cause a count in the NE value counter, which permanently counts clock pulses from the reference clock pulse generator 32, to be loaded into the same register 39. Then, the second clock pulse CP1 is supplied to the NE value counter 38 to reset the count in the counter 38 to zero. Therefore, the engine rpm Ne is measured in the form of a number of reference clock pulses counted between a pulse of the TDC signal and a next one of same, and the count indicative of the measured Ne value is loaded into the engine rpm NE value register 39. Further, the clock pulses CP0-9 are supplied to the KPA value determining circuit 35a, the clock pulses CP2-8 to the KL value determining circuit 28a, the clock pulse CP9 to the multiplier 28b, the clock pulse CP10 to the multiplier 35b and the lift command register 40, and the clock pulse CP11 to the Ti value register 41, respectively. The intake pipe absolute pressure PB sensor 8, the atmospheric pressure sensor 16 and the EGR lift sensor 24 supply their output signals, respectively, the PB value register 30, the PA value register 33 and the lift value register 25, through the A/D converter unit 29. The basic Ti value determining circuit 34 operates on an output signal from the $\frac{1}{2}^l$ dividing circuit 26a, which is in the form of an integral value converted from the intake pipe absolute pressure PB value from the PB value register 30, and an output signal from the $\frac{1}{2}^n$ dividing circuit 26b, which is in the form of an integral value converted from the measured engine rpm NE value from the NE value register 39, to determine a basic valve opening period value Ti. The Ti value thus determined is applied as an input M1 to the input terminal 35b1 of the multiplier 35b of the second atmospheric pressure-dependent correction circuit 35.

The KPA value determining circuit 35a of the second atmospheric pressure-dependent correction circuit 35 operates on the intake pipe absolute pressure PB value signal from the PB value register 30 and the atmospheric pressure PA value signal from the PA value register 33 to determine a value of the atmospheric pressure-dependent correction coefficient KPA in a manner based upon the aforegiven equation (20), which will be described in detail hereinlater by referring to FIGS. 12 and 13, and supplies the resultant determined KPA value to the multiplier 35b2 at its input terminal 35b2 as an input N1.

The multiplier 35b operates in synchronism with each clock pulse CP10 applied thereto from the sequential clock generator 37 to effect a multiplication of the inputs M1 and N1, that is, the basic Ti value and the correction coefficient KPA value, generates through its output terminal 35b3 and supplies the resultant atmospheric pressure-corrected basic Ti value (KPA·Ti) to the Ti value register 41. The Ti value register 41 stores the above corrected basic Ti value (KPA·Ti) upon application of each clock pulse CP11 thereto, and simultaneously supplies the same value to the Ti value control circuit 43. The Ti value control circuit 43 operates on the input value to drive the injector or injectors 6a to open for a period of time corresponding to the input Ti value.

On the other hand, the address register 27 is supplied with the intake pipe absolute pressure PB value signal in the form of an integral value from the PB value register through the $\frac{1}{2}^l$ dividing circuit 26a and the engine rpm NE value signal in the form of an integral value from the NE value register 39 through the $\frac{1}{2}^n$ dividing circuit 26b. The address register 27 operates in synchronism with each clock pulse CP2 to have these values loaded thereinto, and an address value is selectively outputted therefrom, which corresponds to the input NE and PB values. The valve lift command memory 31 operates on this input address value to selectively read therefrom a lift command value LMAP for the exhaust gas recirculation valve, which corresponds to the input address value, and the read value LMAP is applied to the input terminal 28b1 of the multiplier 28b of the first atmospheric pressure-dependent correction circuit 28, as an input M2. Predetermined address values and predetermined lift command values LMAP are stored, respectively, in the address register 27 and the valve lift command memory 31, which values are provided in a map of lift command value LMAP of FIG. 9.

The KL value determining circut 28a of the first atmospheric pressure-dependent correction circuit 28 operates on the input absolute pressure PB value signal in the form of an integral value from the $\frac{1}{2}^l$ dividing circuit 26a, the input engine rpm NE value in the form of an integral value from the $\frac{1}{2}^n$ dividing circut 26b, and the input atmospheric pressure PA value from the PA value register 33 to determine a value of the atmospheric pressure-dependent correction coefficient KL and supplies the resultant correction coefficient KL value to the multiplier 28b at its input terminal 28b2 as an input N2. The manner of determining the KL value will be described hereinlater. The multiplier 28b effects a multiplication of the input M2 by the input N2 in synchronism with each clock pulse CP9 applied thereto, and applies the resultant product, that is, the atmospheric pressure-corrected lift command value KL·LMAP to the lift command register 40 through its output terminal 28b3. The lift command register 40 has its old stored value replaced by a new value KL·LMAP in synchronism with each clock pulse CP10 applied thereto, and simultaneously supplies its newly stored value to the EGR control valve control circuit 42.

An actual valve opening or lift signal LACT from the EGR lift sensor 24 mounted on the exhaust gas recirculation valve 19 in FIG. 5 is converted into a corresponding digital signal by the A/D converter unit 29, and the digital signal is loaded into the lift value register 25. The actual valve opening signal LACT is simultaneously transferred from the register 25 to the EGR control valve control circuit 42. The control circuit 42 operates on the input signal LACT to determine the difference between the actual valve opening value LACT and the aforementioned atmospheric pressure-corrected lift command value KL·LMAP, and actuates both or one of the EGR control valves 21 and 22 in accordance with the absolute value of the differential value and the relative value of same to zero to regulate the pressure in the negative pressure chamber 19d of the exhaust gas recirculation valve 19 so as to make the above differential value zero. In the above stated manner, according to the invention, the exhaust gas recirculating quantity is controlled so as to maintain the exhaust gas recirculating rate at a constant value irrespective of changes in the atmospheric pressure, by means of multiplication of a lift command value LMAP by a value of the atmospheric pressure-dependent correction coefficient KL.

Figure 12:
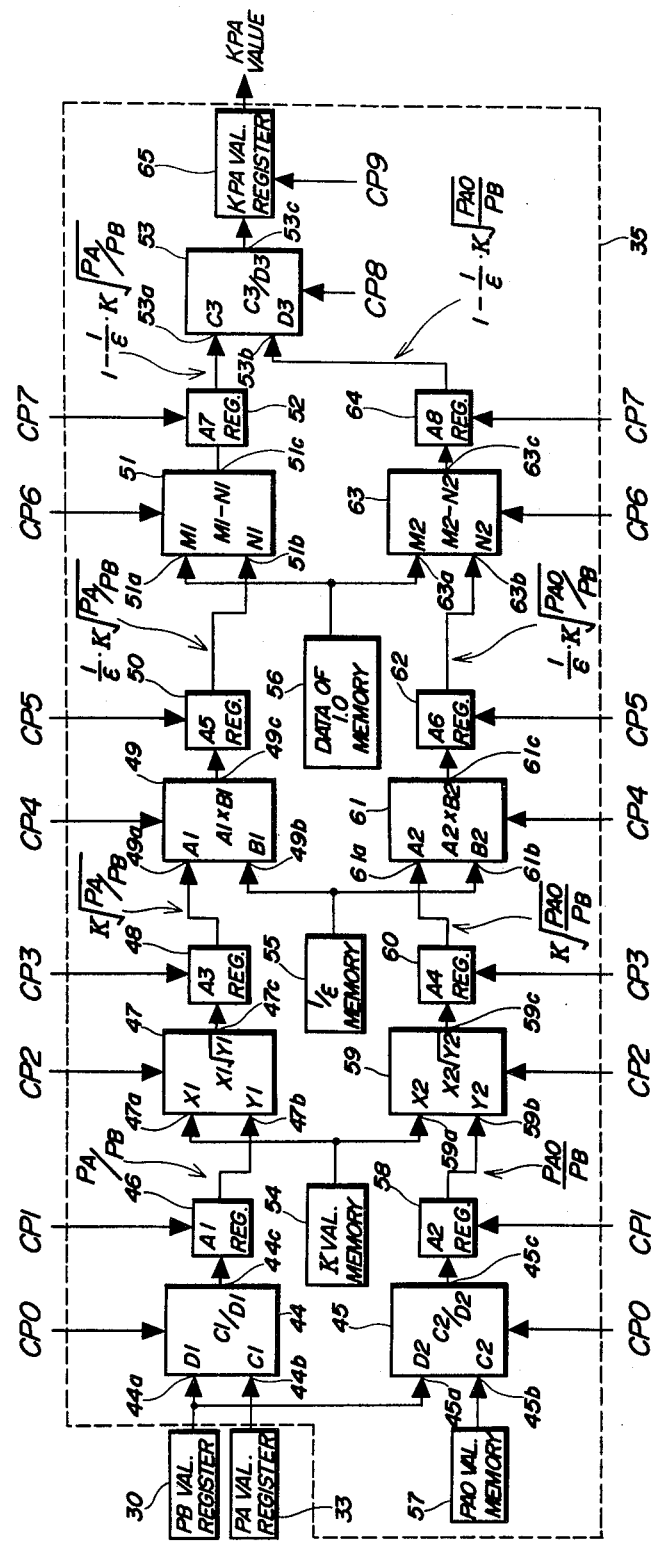
FIG. 12 is a block diagram illustrating an example of the internal arrangement of the correction coefficient KPA value determining circuit in FIG. 10.

FIG. 12 illustrates an example of the interior construction of the KPA value determining circuit 35a in FIG. 10. The circuit 35a according to this example is adapted to determine the value of the correction coefficient KPA by means of arithmetic calculation based upon the equation (20). The PB value register 30 in FIG. 10 has its output connected to a divider 44 at its input terminal 44a as well as another divider 45 at its input terminal 45a. The PA value register 33 in FIG. 10 has its output connected to the divider 44 at its other input terminal 44b. The divider 44 has its output terminal 44c connected to a root calculating circuit 47 at its input terminal 47b, by way of an A1 register 46. The root calculating circuit 47 has its output terminal 47c connected to a multiplier 49 at its input terminal 49a, by way of an A3 register 48, which in turn has its output terminal 49c connected to a subtracter 51 at its input terminal 51b by way of an A5 register 50. The subtracter 51 has its output terminal 51c connected to a divider 53 at its input terminal 53a, by way of an A7 register 52, which in turn has its output terminal 53c connected to the input terminal 35b2 of the multiplier 35b in FIG. 10, by way of a KPA value register 65. The divider 45 has its output terminal 45c connected, by way of an A2 register 58, to a root calculating circuit 59 at its input terminal 59b, which in turn has its output terminal 59c connected to a multiplier 61 at its input terminal 61a, by way of an A4 register 60. The multiplier 61 has its output terminal 61c connected, by way of an A6 register 62, to a subtracter 63 at its input terminal 63b, which in turn has its output terminal 63c connected to the aforementioned divider 53 at its other input terminal 53b by way of an A8 register 64. The divider 45 has its other input terminal 45b connected to a PAo value memory 57. A χ value memory 54 is connected to the other input terminals 47a and 59a of the root calculating circuits 47 and 59. A $1/\epsilon$ value memory 55 is connected to the multipliers 49 and 61 at their other input terminals 49b and 61b. A 1.0 value data memory 56 is connected to the subtracters 51 and 63 at their other input terminals 51a and 63a.

The KPA value determining circuit 35 constructed above operates as follows: An intake pipe absolute pressure PB value signal from the PB value register 30 in FIG. 10 is applied as an input D1 to the input terminal 44a of the divider 44, which has its other input terminal 44b supplied with an atmospheric pressure PA value signal from the PA value register 33 in FIG. 10 as an input C1. At the divider 44, a division of the input C1 by the input D1 is effected in synchronism with each clock pulse CP0 applied thereto from the sequential clock generator 37 in FIG. 10, and the resultant quotient C1/D1, i.e. PA/PB is loaded into the A1 register 46. The A1 register 46 has its old stored value replaced by a new value C1/D1 in synchronism with each clock pulse CP1 applied thereto, and simultaneously the newly stored value C1/D1 is applied to the input terminal 47b of the root calculating circuit 47, as an input Y1. The root calculating circuit 47 has its other input terminal 47a supplied with a value of specific heat $\chi$ from the $\chi$ value memory 54, as an input X1. Thus, the root calculating circuit 47 calculates the X1th root of the input value Y1 or $(PA/PB)^{1/\chi}$ upon application of each clock pulse CP2 thereto, and supplies the resultant root to the A3 register 48 through its output terminal 47c. The A3 register 48 has its old stored value replaced by a new value $X1\sqrt{Y1}$ upon application of each clock pulse CP3 thereto, and simultaneously applies the new value to the input terminal 49a of the multiplier 49 as an input A1, which has its other input terminal 49 supplied with a value of $1/\epsilon$ from the $1/\epsilon$ value memory 55 as an input B1. Thus, at the multiplier 49 a multiplication of the input A1 by the input B1 is carried out in synchronism with each clock pulse CP4 applied thereto. The resultant product A1·B1 or $1/\epsilon(PA/PB)^{1/\chi}$ is generated through the output terminal 49c of the multiplier 49 and applied to the A5 register 50 which has the new value A1·B1 loaded thereinto upon application of each clock pulse CP5 thereto, and simultaneously applies the same new value to the input terminal 51b of the subtracter 51 as an input N1. The subtracter 51 has its other input terminal 51a supplied with a data value of 1.0 from the 1.0 data value memory 56, as an input M1. A subtraction of the input N1 from the input M1 is carried out at the subtracter 51 in synchronism with clock pulse CP6 applied thereto. The resultant difference M1−N1 or $1-(1/\epsilon)(PA/PA)^{1/\chi}$ is supplied through the output terminal 51c of the subtracter 51 to the A7 register 52. The A7 register 57 has its old stored value replaced by a new value upon application of each clock pulse CP7 thereto, and simultaneously applies the new value to the input terminal 53a of the divider 53 as an input C3.

On the other hand, similar arithmetic operations to those described above are carried out at the divider 45, the root calculating circuit 59, the multiplier 61 and the subtracter 63, as well. More specifically, at the divider 45, a division of a standard atmospheric pressure value PA0 applied to the input terminal 45b from the PA0 value memory 57 by an intake pipe absolute pressure PB value from the PB value register 30 is carried out to obtain a quotient PA0/PB. In similar manners, a value of $(PA0/PB)^{1/\chi}$ is calculated by the root calculating circuit 59, $(1/\epsilon)(PA0/PB)^{1/\chi}$ by the multipler 61, and $1-(1/\epsilon)(PA0/PB)^{1/\chi}$ by the subtracter 63, respectively. Finally, the value $1-(1/\epsilon)(PA0/PB)^{1/\chi}$ is applied to the input terminal 53b of the divider 53, as an input D3. At the divider 53, a quotient C3/D3, that is, $\{1-(1-\epsilon)(PA0/PB)^{1/\chi}\}/\{1-(1/\epsilon)(PA0/PB)^{1/\chi}\}$ is calculated in synchronism with each clock pulse CP8 applied thereto, and supplied to the KPA value register 65. The KPA value register 65 has its old stored value replaced by the new value C3/D3 in synchronism with each clock pulse CP9, and simultaneously applies the new stored value to the input terminal 35b2 of the multiplier 35 in FIG. 10.

FIG. 13 illustrates another example of the KPA value determining circuit 35a. The circuit shown in FIG. 13 is adapted to determfine the KPA value by means of reading from a memory storing predetermined KPA values previously determined as a function of atmospheric pressure PA and intake pipe absolute pressure PB, on the basis of the aforementioned equation (20). The PB value register 30 in FIG. 10 has its output connected to an address register 67 at its first input terminal 67a by way of a $\frac{1}{2}^m$ dividing circuit 66. The PA value register 33 in FIG. 10 has its output connected to the above address register 67 at its second input terminal 67b by way of a $\frac{1}{2}^n$ dividing circuit 68. The address register 67 has its output terminal 67c connected to the input of a KPA value data memory 69 which has its output connected to the input of a KPA value register 70. The KPA value register 70 has its output connected to the input terminal 35b2 of the multiplier 35b in FIG. 10.

The KPA value data memory 69 stores a plurality of predetermined KPA values KPAij in accordance with a map shown in FIG. 14. In FIG. 14, the map is provided with these KPA values KPAij which have been previously determined by means of the equation (20) with the atmospheric pressure PA and the intake pipe absolute pressure PB as parameters. In the map of FIG. 14, each eight predetermined PA and PB values are provided. However, the PA value and the PB value may be divided in a larger number of steps, if required. If the PA value or the PB value actually detected falls between adjacent predetermined values provided in the map, the KPA value may be determined by means of interpolation, so as to avoid using a memory having a large capacity.

The address register 67 stores a plurality of address values corresponding to the above predetermined KPA values KPAij stored in the memory 69. An output signal from the PB value register 30 in FIG. 10 is converted into an integral value by the $\frac{1}{2}^m$ dividing circuit 66 in FIG. 13, and the integral value is applied to the first input terminal 67a of the address register 67. On the other hand, an output signal from the PA value register 33 is also converted into an integral value by the $\frac{1}{2}^n$ dividing circit 68, and the integral value is applied to the second input terminal 67b of the address register 67. An address value corresponding to the input integral values indicative of actual PA and PB values is read from the address register 67 in synchronism with each clock pulse CP2 applied thereto, and the read address value is applied to the KPA value data memory 69, where a value of the correction coefficient KPA corresponding to the input address value is read. The read KPA value is loaded into the KPA value register 70 in synchronism with each clock pulse CP3 applied thereto, and simultaneously applied to the input terminal 35b2 of the multiplier 35b in FIG. 10.

Figure 15A:
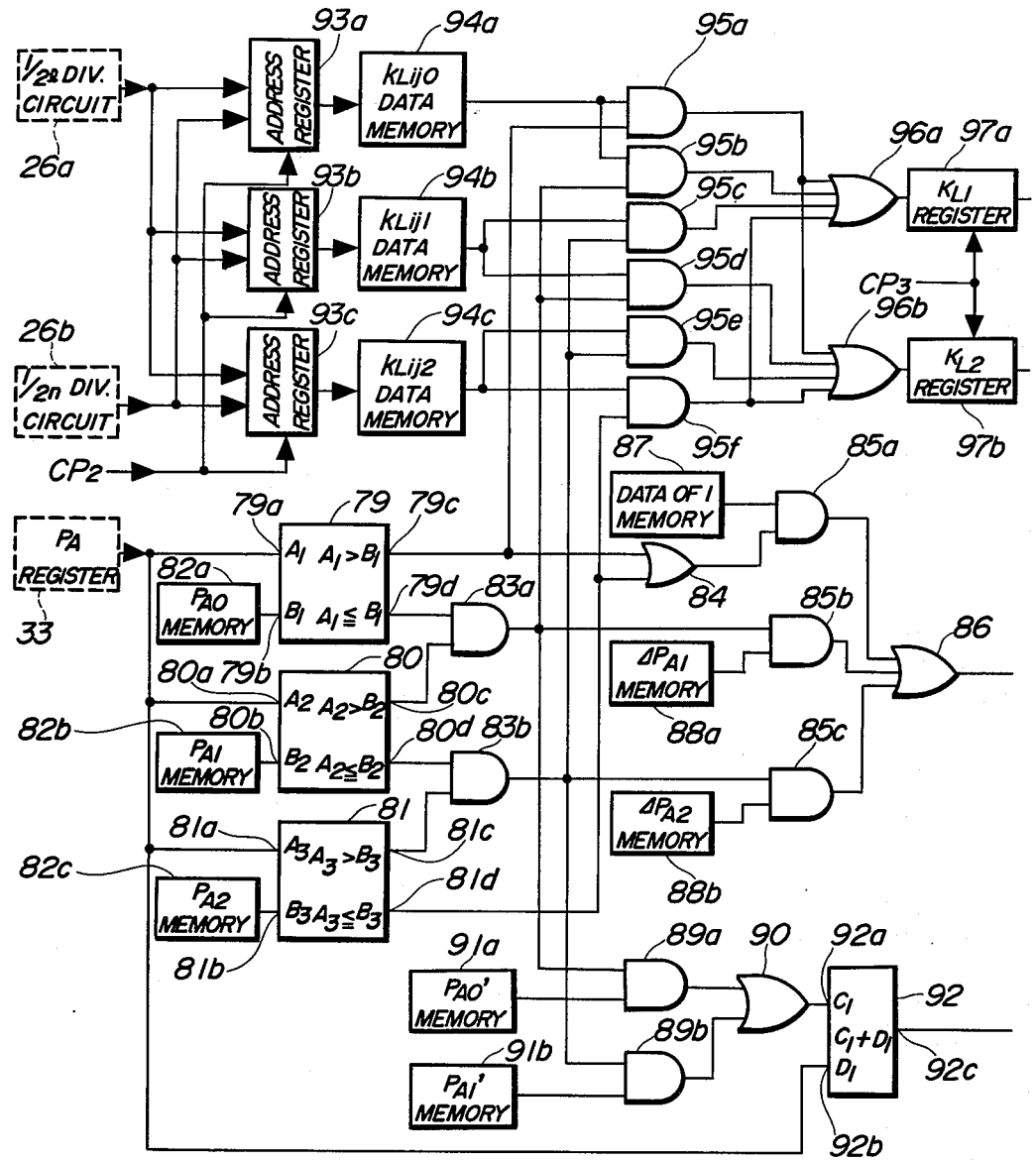
FIG. 15 is a circuit diagram illustrating an example of the internal arrangement of the correction coefficient KL value determining circuit in FIG. 10.
Figure 15:
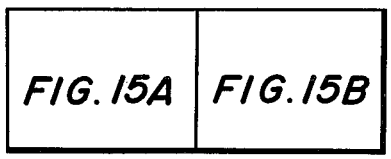
Figure 15B:
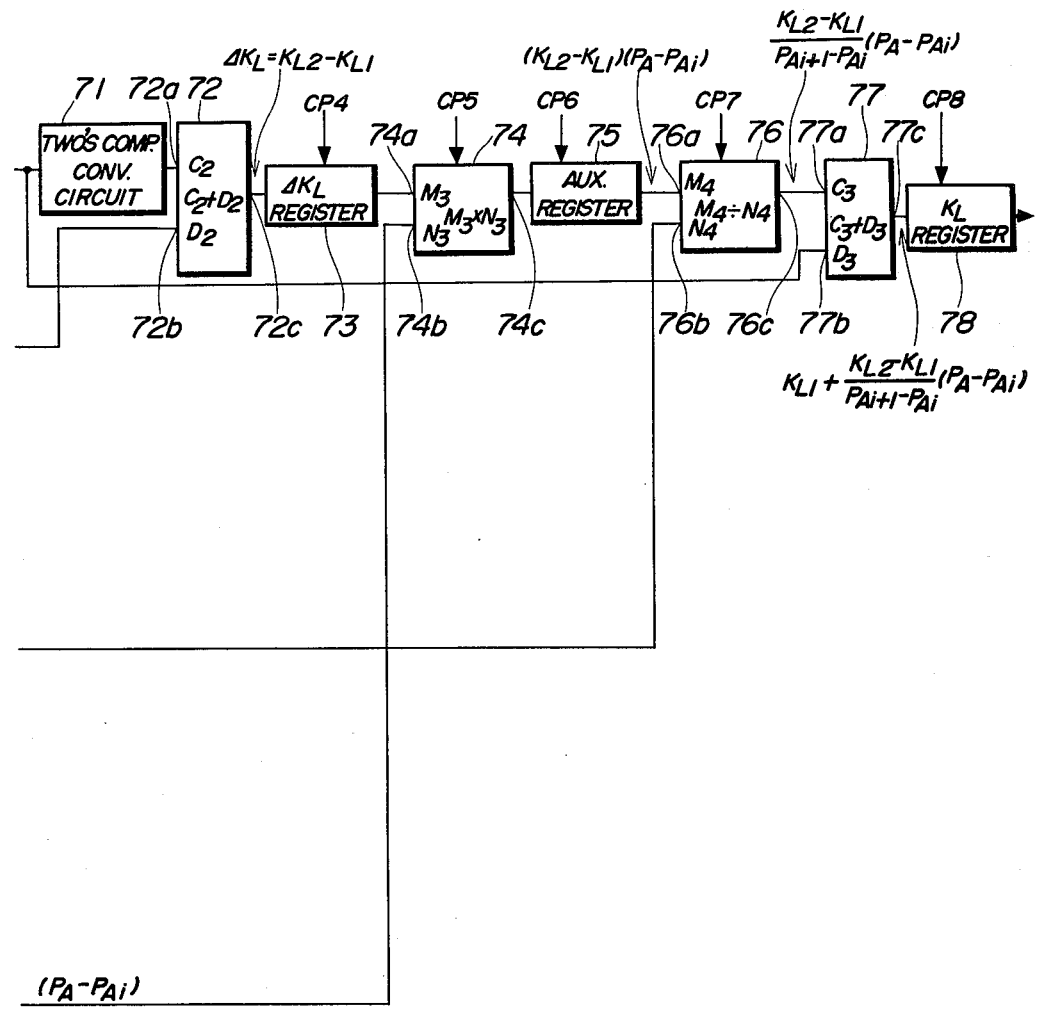

FIG. 15 illustrates by way of example the interior construction of the KL value determining circuit 28a of the first atmospheric pressure-dependent correction circuit 28 in FIG. 10. The $\frac{1}{2}^l$ dividing circuit 26a and the $\frac{1}{2}^n$ dividing circuit 26b, both appearing in FIG. 10 have their outputs connected to the inputs of address register 93a-93c which in turn have their outputs connected, respectively, to a KLij0 value data memory 94a-a KLij2 value data memory 94c, at their inputs. The KLij0 value data memory 94a has its output connected to one input terminals of AND circuits 95a and 95b, the KLij1 value data memory 94b to one input terminals of AND circuits 95c and 95d, and the KLij2 value data memory 94c to one input terminals of AND circuits 95e and 95f, respectively. The AND circuits 95a-95c and 95f have their outputs connected to the input of an OR circuit 96a, and the AND circuits 95a and 95d-95f have their outputs connected to the input of another OR circuit 96b. The OR circuit 96a has its output connected to a two's complement converting circuit 71 and one input termfinal 77b of an adder 77, both by way of a KL1 value register 97a, while the OR circuit 69b has its output connected to an input terminal 72b of an adder 72 by way of a KL2 value register 97b. The two's complement converting circuit 71 has its output connected to the other input terminal 72a of the adder 72. The adder 72 in turn has its output terminal 72c connected to an input terminal 74a of a multiplier 74 by way of a ΔKL value register 73. The multiplier 74 has its output terminal 74c connected to an input terminal 76a of a divider 76 by way of an auxiliary register 75, which in turn has its output terminal 76c connected to the other input terminal 77a of the adder 77. The adder 77 has its output terminal 77c connected to the input of a KL value register 78 which in turn has its output connected to the input terminal 28b2 of the multiplier 28b of the first atmospheric pressure-dependent correction circuit 28 in FIG. 10.

The PA value register 33 in FIG. 10 is connected to input terminals 79a-81a of comparators 79-81 as well as an input terminal 92b of an adder 92. A PA0 value memory 82a-PA2 value memory 82c are connected to the other input terminals 79b-81b of the respective comparators 79-81. The comparator 79 has its output terminal 79c connected to the other input terminal of the AND circuit 95a as well as the input of an OR circit 84, and its output terminal 79d to one input terminal of an AND circuit 83a, respectively. The comparator 80 has its output terminal 80c connected to the other input terminal of the AND circuit 83a and its output terminal 80d to an input terminal of an AND circuit 83b, respectively. The comparator 81 has its output terminal 81c connected to the other input terminal of the AND circuit 83b and its other output terminal 81d to the input of the OR circuit 84, as well as the other input terminal of the AND circuit 95f, respectively. The OR circuit 84 has its output connected to the input of an OR circuit 86 by way of an AND circit 85a, while the AND circuit 83a has its output connected to the inputs of AND circuits 95b, 95d, 85b and 89a. The AND circuit 83b has its output connected to the inputs of AND circuit 95c, 95e, 85c and 89b. The AND circuits 85b and 85c have their outputs connected to the input of the OR circit 86 which in turn has its output connected to the input terminal 76b of the aforementioned divider 76. The AND circuit 85a has its other input terminal connected to a 1 value data memory 87, and the AND circuits 85b and 85c have their other inputs terminals connected, respectively, to a ΔPA1 value memory 88a and a ΔPA2 value memory 88b. The AND circuits 89a and 89b have their other input terminals connected, respectively, to a PA0' value memory 91a and a PA1' value memory 91b, and their output terminals to the other input terminal 92a of the adder 92 by way of an OR circuit 90, respectively. The adder 92 has its output terminal 92c connected to the other input terminal 74b of the aforementioned multiplier 74.

Figure 16:
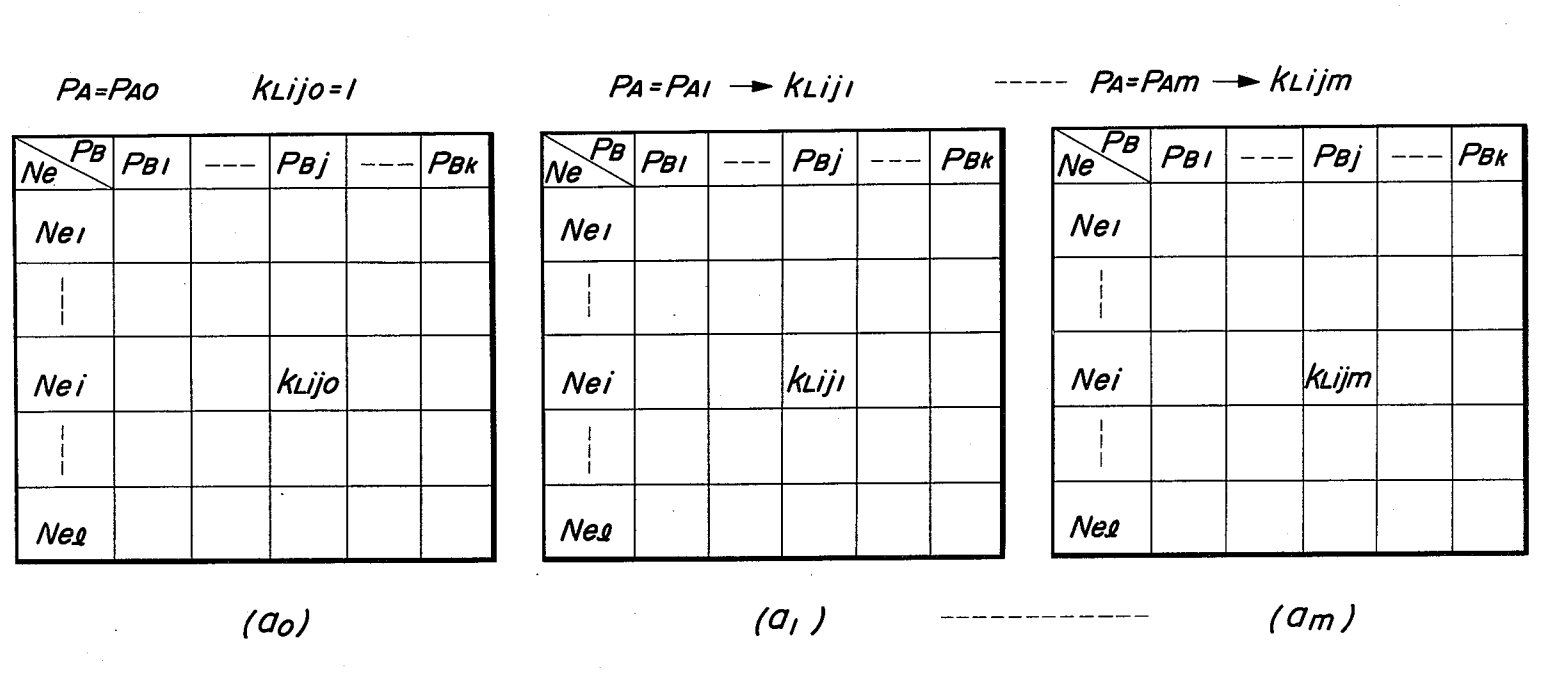

The KL value determining circuit 28a constructed above operates as follows: The address registers 93a-93c each store a set of address values for selection of values KLij of atmospheric pressure-dependent correction coefficient KL corresponding to intake pipe absolute pressure PB and engine rpm Ne. The three sets of address values are applicable, respectively, when the atmosperic pressure PA has values PA0, PA1 and PA2. The KLij0 value data memory 94a through the KLij2 value data memory 94c store three sets of predetermined values KLij corresponding to respective sets of address values. Three sets of predetermined KL values KLij are stored in the memories 94a-94c in accordance with their respective different maps shown in FIG. 16 in which they are provided with intake pipe absolute pressure PB and engine rpm Ne as parameters, and which are divided according to the above different values PA0, PA1 and PA2 of atmosperic pressure PA. In FIG. 16, the a0th map in FIG. 16 are provided with a first set of predetermined values KLij0 applicable when the atmospheric pressure PA has a value PA0 equal to the standard atmospheric pressure, e.g. 760 mmHg, and the a1th map a second set of predetermined values KLij1 applicable when the atmospheric pressure PA has a value PA1 equal to 750 mmHg, for instance, respectively. In the same manner as above, a map (am) which is in an (m+1)th place in the map group of FIG. 16 is provided with a mth set of predetermined values KLijm applicable when the atmospheric pressure PA has a value PAm. The above predetermined values KLij0-KLijm are experimentally previously determined as a function of intake pipe absolute pressure PB and engine rpm Ne. A value of correction coefficient KL is selected from these a0th-amth maps, which corresponds to actual atmospheric pressure, actual intake pipe absolute pressure PB and actual engine rpm Ne. The selected KL value is subjected to multiplication by a basic valve lift value Lij for the exhaust gas recirculation valve which is determined from the map of FIG. 9 in accordance with actual intake pipe absolute pressure PB and actual engine rpm Ne, to thereby always maintain the exhaust gas recirculating rate at a constant value against changes in the atmospheric pressure. The number of maps (which is m+1), the number of predetermined values PBj of intake pipe absolute pressure PB and the number of predetermined values Nei of engine rpm Ne may each be set at a suitable value in view of the memory capacity, etc. An interpolation method may be used for determining a value of correction coefficient KL if actual intake pipe absolute pressure PB or actual engine rpm Ne falls between adjacent predetermined values in each of the maps, in a manner similar to that used for determining a value of the correction coefficient KPA.

In the example of FIG. 15 are used only three maps for simplification of the illustration and the description. Also, the circuit of FIG. 15 is adapted to determine the value of the correction coefficient KL by means of interpolation dependent upon atmospheric pressure PA.

An intake pipe absolute pressure PB signal in the form of an integral value outputted from the $\frac{1}{2}^l$ dividing circuit 26a in FIG. 10 and an engine rpm NE signal in the form of an integral value outputted from the $\frac{1}{2}^n$ dividing circuit 26b in FIG. 10 are supplied to the address registers 93a–93c. Upon application of each clock pulse CP2 to the registers, address values are read from these registers, which correspond to the PB and NE values inputted thereto, and the read address values are applied to respective ones of the KLij0 value data memory 94a through the KLij2 value data memory 94c. From these data memories 94a–94c, values KLij of the correction coefficient KL are read, which correspond to the input address values, and supplied to the respective AND circuits 95a–95f.

On the other hand, an atmospheric pressure PA signal from the PA value register 33 in FIG. 10 is supplied to the comparators 79–81 at their input terminals 79a–81a, as inputs A1–A3. The comparators 79–81 have their other input terminals 79b–81b supplied, respectively, with predetermined reference atmospheric pressure values PA0, PA1 and PA2 from the PA0 value memory 82a, the PA1 value memory 82b and the PA2 value memory 82c, as inputs B1–B3.

Let it now be assumed that the atmospheric pressure PA is in the relationship of PA1<PA<PA0. Then, the input relationship of A1≦B1 or PA≦PA0 stands at the comparator 79. An output of 0 is then generated at the output terminal 79c of the comparator 79 and supplied to the AND circuit 85a through the OR circuit 84 and also to the AND circuit 95a directly, and simultaneously an output of 1 is generated at the other output terminal 79d and supplied to the AND circuit 83a. At the same time, the comparator 80 has the input relationship of A2>B2 or PA1<PA so that an output of 1 is supplied through the output terminal 80c to the AND circuit 83a, and an output of 0 through the other output terminal 80d to the AND circuit 83b, respectively. At the comparator 81, the input relationship of A3>B3 or PA2<PA stands so that an output of 1 is supplied through the output terminal 81c to the AND circuit 83b, and an output of 0 through the other output terminal 81d to the AND circuit 95f directly and also to the AND circuit 85a through the OR circuit 84, respectively. Having its two input terminals both supplied with outputs of 1, the AND circuit 83a generates an output of 1 and applies same to the AND circuits 95b, 95d, 85b and 89a. On the other hand, the AND circuit 83b, which is supplied with the output of 0 from the output terminal 80d of the comparator 80, generates an output of 0 and applies same to the AND circuits 95c, 95e, 85c and 89b. As stated above, of the AND circuits 95a–95f, only the AND circuits 95b and 95d are opened on this occasion. Consequently, a value KLij0 selected from a map corresponding to the atmospheric pressure value PA0 is delivered from the KLij0 value data memory 94a to the KL1 value register 97a through the AND circuit 95b and the OR circuit 96a. A value KLij1 selected from another map corresponding to the atmospheric pressure value PA1 is supplied to the KL2 value register 97b through the AND circuit 95d and the OR circuit 96b. The above value KLij0 delivered to the KL1 value register 97a is loaded as a value KL1 into the same register 97a upon application of each clock pulse CP3 thereto, and simultaneously the newly loaded value KL1 is applied to the two's complement converting circuit 71 as well as to the input terminal 77b of the adder 77 as an input D3. On the other hand, the KL1 value supplied to the two's complement converting circuit 71 is converted into a negative value and then applied to the input terminal 72a of the adder 72 as an input C2. On the other hand, the value KLij1 supplied to the KL2 value register 97b is loaded as a value KL2 into the same register upon application of each clock pulse CP3 thereto, and simultaneously the newly loaded value KLij1 or KL2 is applied to the other input terminal 72b of the above adder 72 as an input D2. At the adder 72, an addition of the input C2 and the input D2 is carried out, that is, in fact, a subtraction of the value KL1 from the value KL2 is carried out, and the resultant difference ΔKL is applied to the ΔKL value register 73 and loaded into the same register upon application of each clock pulse CP4 thereto, and simultaneously the newly loaded value ΔKL is applied to the input terminal 74a of the multiplier 74 as an input M3.

The PA0' value memory 91a stores a value of the two's complement of the reference or standard atmospheric pressure value PA0, which is supplied to the AND circuit 89a. The PA1' value memory 91b stores a value of the two's complement of the reference atmospheric pressure value PA1, which is supplied to the AND circuit 89b. Since on this occasion the output of 1 from the AND circuit 83a is supplied to the AND circuit 89a, the latter is opened to allow the two's complement value of the value PA0 from the PA0's value memory 91a to be applied as an input C1 to the input terminal 92a of the adder 92 through the AND circuit 89a and the OR circuit 90. On the other hand, the adder 92 then has its other input terminal 92b supplied with an atmospheric pressure PA value from the PA value register 33, as an input D1, and the resultant sum C1+D1 or PA−PAi is supplied through the output terminal 92c of the adder 92 to the input terminal 74b of the multiplier 74, as an input N3. Upon application of each clock pulse CP5 to the multiplier 74, it carries out a multiplication of the input M3 by the input N3, and supplies the resultant product M3·N3 or (KL2−KL1)·(PA−PAi) to the auxiliary register 75. The above product M3·N3 is loaded into the auxiliary register 75 in synchronism with application of each clock pulse CP6 thereto, and simultaneously the newly loaded value is applied to the input terminal 76a of the divider 76 as an input M4.

The ΔPA1 value memory 88a stores a value (PA1−PA0) and supplies it to the AND circit 85b, while the ΔPA2 value memory 88b stores a value (PA2−PA1) and supplies it to the AND circuit 85c. Since on this occasion the AND circuit 85b is opened by the output of 1 from the AND circuit 83a, the stored value in the ΔPA1 value memory 88a is supplied to the divider 76 at its other input terminal 76b through the AND circuit 85b and the OR circuit 86, as an input N4. The divider 76 carries out a division of the input M4 by the input N4 in synchronism with application of each clock pulse CP7 thereto, and supplies the resultant quotient M4/N4 or (KL2−KL1)·(PA−PAi)/(PAi+1−PAi) to the adder 77 at its input terminal 77a, as an input C3. The adder 77 carries out an addition of the input C3 and the input D3, and supplies the resultant sum C3+D3 or KL1+(KL2−KL1)·(PA−PAi)/(PAi+1−PAi) to the KL value register 78. The sum value is loaded into the register 78 in synchronism with application of each clock pulse CP8 thereto, and simultaneously the newly loaded value is applied to the input terminal 28b2 of the multiplier 28b of the first atmospheric pressure-dependent correction circuit 28 in FIG. 10.

Although the above described operation is based upon the assumption that the atmospheric pressure PA is in the relationship of PA1<PA<PA0, a similar operation to the above is carried out also when the relationship of PA2<PA<PA1 stands.

When the atmospheric pressure PA is larger than the reference value PA0 or smaller than the reference value PA2, the KL1 value register 97a and the KL2 value register 97b have the same value KLij0 or KLij2 stored therein, so that the sum obtained by the adder 72 is zero. That is, when the atmospheric pressure PA is larger than PA0 or smaller than PA2, the interpolation is not carried out, but a selected predetermined value KLij0 or KLij2 in a map is directly supplied to the multiplier 28b in FIG. 10, as an atmospheric pressure-dependent correction coefficient KL immediately applicable for correction of the basic lift valve LMAP.

What is claimed is:

1. In an electronic fuel injection control system for use with an internal combustion engine of the type having an intake passage, an exhaust passage, a throttle valve arranged in said intake passage, and at least one fuel injection valve disposed to inject fuel being supplied to said engine, a valve opening period of which determines the fuel injection quantity, the combination comprising: a first sensor for detecting a value of engine rpm; a second sensor for detecting a value of absolute pressure in said intake passage of said engine at a location downstream of said throttle valve; a third sensor for detecting a value of ambient atmospheric absolute pressure; an exhuast gas recirculation passage communicating said exhaust passage of said engine with said intake passage of same at a location downstream of said throttle valve; an exhaust gas recirculation valve arranged across said exhaust gas recirculation passage; means for determining a desired value of the valve opening of said exhaust gas recirculation valve as a function of values of engine rpm and absolute pressure in said intake passage detected, respectively, by said first sensor and said second sensor, and generating a command signal indicative of the determined desired valve opening value; first correcting means for determining a value of a predetermined correction coefficient as a function of values of engine rpm, absolute pressure in said intake passage, and ambient atmospheric absolute pressure detected, respectively, by said first sensor, said second sensor, and said third sensor, and correcting said desired valve opening value indicated by said command signal by the determined value of said predetermined correction coefficient, whereby a quantity of exhaust gases being recirculated through said exhaust gas recirculation passage is maintained at a constant ratio with respect to a total intake air quantity being supplied to said engine through said intake passage; means responsive to a signal indicative of the corrected valve opening value generated by said first correcting means to drive said exhaust gas recirculation valve to open through said corrected valve opening; means for determining a basic valve opening period value for said fuel injection valve as a function of values of engine rpm and absolute pressure in said intake passage detected, respectively, by said first sensor and said second sensor; second correcting means for correcting said determined basic valve opening period value as a function of values of atmospheric absolute pressure and absolute pressure in said intake passage detected, respectively, by said third sensor and said second sensor; and means responsive to an output from said second correcting means to drive said fuel injection valve to open for a period of time corresponding to said output.

2. The electronic fuel injection control system as claimed in claim 1, wherein said second correcting means comprises means adapted to determine a value of a second predetermined correction coefficient by means of an equation given below, and means for multiplying said determined basic valve opening period value by said determined value of said second predetermined correction coefficient:

$$KPA = \frac{1 - (1/\epsilon)(PA/PB)^{1/\chi}}{1 - (1/\epsilon)(PAo/PB)^{1/\chi}}$$

where KPA represents the second predetermined correction coefficient, $\epsilon$ the compression ratio of said engine, PA the atmospheric absolute pressure, PAo the standard atmospheric absolute pressure, PB intake pipe absolute pressure, and $\chi$ the ratio of specific heat of air, respectively.

3. The electronic fuel injection control system as claimed in claim 1, wherein said first correcting means comprises means storing a plurality of predetermined values of said predetermined correction coefficient, which are previously determined as a function of absolute pressure in said intake passage, engine rpm and atmospheric absolute pressure, means for reading at least two predetermined values of said predetermined correction coefficient from said storing means, which correspond to values of engine rpm, absolute pressure in said intake passage and atmospheric absolute pressure detected, respectively, by said first sensor, said second sensor and said third sensor, and means for arithmetically calculating a desired value of said predetermined correction coefficient from said read predetermined values of said predetermined correction coefficient and the detected atmospheric absolute pressure, by means of interpolation.

4. The electronic fuel injection control system as claimed in claim 3, wherein said first correcting means comprises: means storing a plurality of different sets of predetermined values of said predetermined correction coefficient, which are previously determined as a function of absolute pressure in said intake passage and engine rpm, said different sets individually corresponding to a plurality of different predetermined values of atmospheric absolute pressure; means operable to select two adjacent sets from said different sets of predetermined values of said predetermined correction coefficient, which correspond to two adjacent ones of said different predetermined atmospheric absolute pressure values, between which a detected value of atmospheric absolute pressure falls, and select two predetermined values of said predetermined correction coefficient from said selected two adjacent sets, which correspond to detected values of engine rpm and absolute pressure in said intake passage, and means for arithmetically calculating a value of said predetermined correction coefficient by means of a difference between said selected two predetermined values of said predetermined correction coefficient, a difference between said selected two adjacent predetermined atmospheric absolute pressure values, and a difference between one of said selected two adjacent predetermined atmospheric absolute pressure values and said detected atmospheric absolute pressure value.

5. The electronic fuel injection control system as claimed in claim 4, wherein when a detected value of atmospheric absolute pressure is larger than a maximum value of said predetermined atmospheric absolute pressure values or smaller than a minimum value thereof, said arithmetically calculating means is operable to select one set from said different sets of predetermined values of said predetermined correction coefficient, which corresponds to said maximum value of said predetermined atmospheric absolute pressure values or said minimum value thereof, select one predetermined value of said predetermined correction coefficient from said selected one set, which corresponds to detected values of engine rpm and absolute pressure in said intake passage, and directly apply said selected one predetermined correction coefficient value as a value of said predetermined correction coefficient for correcting said desired valve opening value indicated by said command signal.

* * * * *